United States Patent
Sano et al.

(10) Patent No.: US 11,706,006 B2
(45) Date of Patent: Jul. 18, 2023

(54) USER EQUIPMENT APPARATUS, BASE STATION, DEMODULATION REFERENCE SIGNAL TRANSMISSION METHOD

(71) Applicant: NTT DOCOMO, INC., Tokyo (JP)

(72) Inventors: Yousuke Sano, Tokyo (JP); Kazuki Takeda, Tokyo (JP); Satoshi Nagata, Tokyo (JP); Shaozhen Guo, Beijing (CN); Xin Wang, Beijing (CN); Xiaolin Hou, Beijing (CN); Huiling Jiang, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/474,701

(22) PCT Filed: Nov. 30, 2017

(86) PCT No.: PCT/JP2017/043001
§ 371 (c)(1),
(2) Date: Jun. 28, 2019

(87) PCT Pub. No.: WO2018/128034
PCT Pub. Date: Jul. 12, 2018

(65) Prior Publication Data
US 2019/0342051 A1   Nov. 7, 2019

(30) Foreign Application Priority Data

Jan. 6, 2017  (JP) .................. 2017-001453

(51) Int. Cl.
*H04W 72/0446*    (2023.01)
*H04W 72/20*    (2023.01)
(Continued)

(52) U.S. Cl.
CPC .............. *H04L 5/0051* (2013.01); *H04L 5/10* (2013.01); *H04W 72/04* (2013.01); *H04W 72/0446* (2013.01); *H04W 72/20* (2023.01)

(58) Field of Classification Search
CPC ......... H04W 72/0406; H04W 72/0413; H04W 72/0446; H04W 72/12; H04W 72/042;
(Continued)

(56) References Cited

U.S. PATENT DOCUMENTS

2012/0329400 A1 * 12/2012  Seo ..................... H04L 5/005
                                                                 455/63.1
2014/0204807 A1 *  7/2014  Li .......................... H04L 1/0026
                                                                 370/277
(Continued)

FOREIGN PATENT DOCUMENTS

JP     2012-147048 A    8/2012
WO    2015094914 A1    6/2015

OTHER PUBLICATIONS

Interference cancellation and channel estimation for MIMO-LTE-A networks, Sridhar et al., IEEE Wispnet 2016 conference (Year: 2016).*

(Continued)

*Primary Examiner* — Joshua Kading
(74) *Attorney, Agent, or Firm* — Osha Bergman Watanabe & Burton LLP

(57) ABSTRACT

A user equipment apparatus in a radio communication system in which uplink communication and downlink communication are dynamically changed includes a reception unit configured to receive, from a base station, control information indicating a resource for an uplink demodulation reference signal in a subframe used for transmitting uplink data; and a transmitting unit configured to transmit the uplink demodulation reference signal according to the control information; wherein the resource for the uplink (Continued)

demodulation reference signal is multiplexed into a part of resources corresponding to one or more symbols at a beginning of a data segment in the subframe used for transmitting the uplink data.

7 Claims, 28 Drawing Sheets

(51) Int. Cl.
   *H04W 72/04* (2023.01)
   *H04L 5/00* (2006.01)
   *H04L 5/10* (2006.01)
(58) Field of Classification Search
   CPC .... H04W 72/04; H04W 72/20; H04L 5/1469; H04L 5/0007; H04L 5/0051; H04L 5/10
   See application file for complete search history.

(56) References Cited

U.S. PATENT DOCUMENTS

| | | | | |
|---|---|---|---|---|
| 2014/0334400 | A1* | 11/2014 | Chen | H04L 5/1469 370/329 |
| 2015/0312937 | A1* | 10/2015 | Suzuki | H04B 7/2656 370/255 |
| 2016/0043843 | A1* | 2/2016 | Liu | H04W 72/042 370/329 |
| 2016/0112173 | A1* | 4/2016 | Wang | H04L 5/0048 370/329 |
| 2017/0171850 | A1* | 6/2017 | Ang | H04L 5/1469 |
| 2017/0272220 | A1* | 9/2017 | Chen | H04B 7/0417 |
| 2017/0317794 | A1* | 11/2017 | You | H04L 5/0051 |
| 2017/0331577 | A1* | 11/2017 | Parkvall | H04B 7/0848 |
| 2018/0041316 | A1* | 2/2018 | Ko | H04L 5/10 |
| 2018/0092111 | A1* | 3/2018 | Chaudhuri | H04L 47/24 |
| 2019/0207731 | A1* | 7/2019 | Park | H04W 72/042 |
| 2019/0373614 | A1* | 12/2019 | Yum | H04W 72/042 |
| 2020/0029270 | A1* | 1/2020 | Matsuda | H04W 48/10 |
| 2020/0305094 | A1* | 9/2020 | Ouchi | H04L 5/0055 |

OTHER PUBLICATIONS

International Search Report issued in PCT/JP2017/043001 dated Feb. 6, 2018 (5 pages).

Written Opinion of the International Searching Authority issued in PCT/JP2017/043001 dated Feb. 6, 2018 (4 pages).

Samsung; "RS Design for Cross-link Interference in Dynamic TDD"; 3GPP TSG RAN WG1 #87, R1-1612564; Reno, USA; Nov. 14-18, 2016 (4 pages).

Qualcomm Incorporated; "Views on UL DMRS design"; 3GPP TSG-RAN WG1 #87, R1-1612050; Reno, USA; Nov. 14-18, 2016 (4 pages).

Yu, B. et al.; "Dynamic TDD support in the LTE-B enhanced Local Area architecture"; GC' 12 Workshop: The 4th IEEE International Workshop on Heterogeneous and Small Cell Networks (HetSNets), Dec. 2012, pp. 585-591 (7 pages).

3GPP TR 36.829 V11.1.0; "3rd Generation Partnership Project; Technical Specification Group Radio Access Network; Enhanced performance requirement for LTE User Equipment (UE) (Release 11)"; Dec. 2012 (114 pages).

Extended European Search Report issued in European Application No. 17889953.0, dated Aug. 3, 2020 (13 pages).

Notice of Reasons for Refusal issued in Japanese Application No. 2018-560340 dated Nov. 24, 2021 (6 pages).

Samsung, "Inter-cell Interference Management for Uncoordinated TDD" 3GPP TSG RAN WG1 #86-bis, R1-1609125, Lisbon, Portugal, Oct. 10-14, 2016 (3 pages).

Office Action issued in Chinese Application No. 201780082141.4 dated Sep. 29, 2022 (12 pages).

Huawei, HiSilicon, "Symmetric RS design for flexible duplex", 3GPP TSG RAN WG1 Meeting #87, R1-1611226, Reno, USA, Nov. 14-18, 2016 (5 pages).

* cited by examiner

DL/UL PATTERN COMMON TO CELLS IS USED
(DL/UL IS DEFINED IN ADVANCE)

DL/UL PATTERN IS INDIVIDUALLY CONFIGURED IN EACH CELL
(DL/UL CAN BE CHANGED ACCORDING TO REQUIRED TRAFFIC)

FIG.4
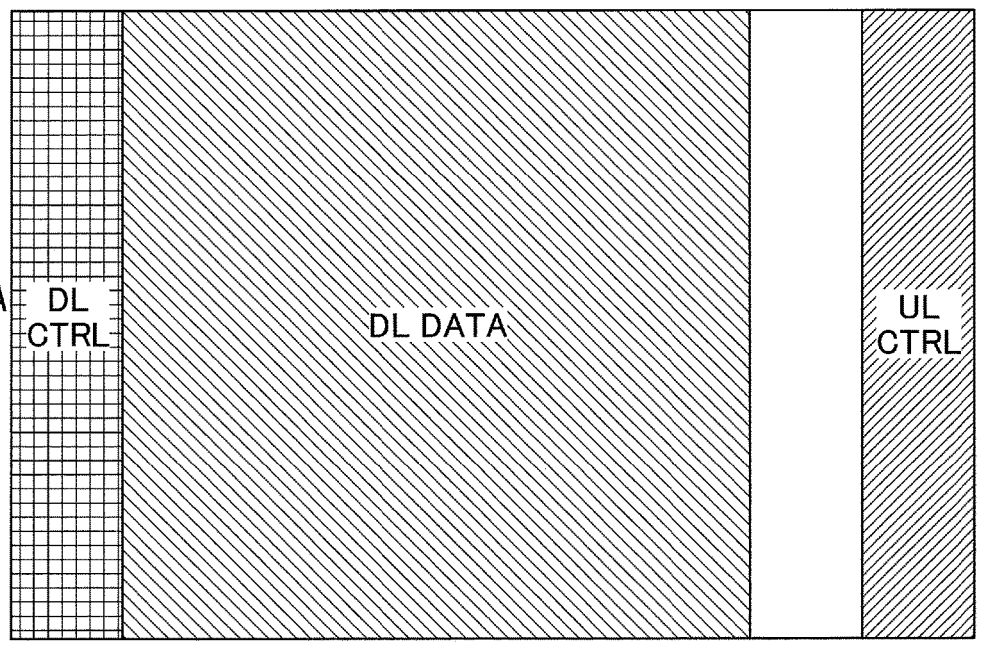
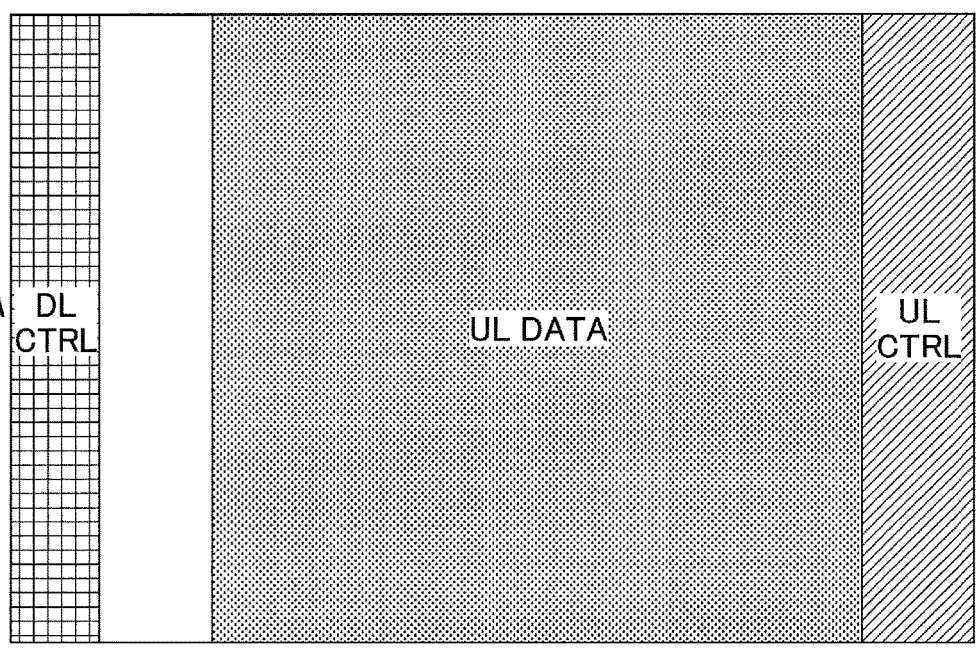

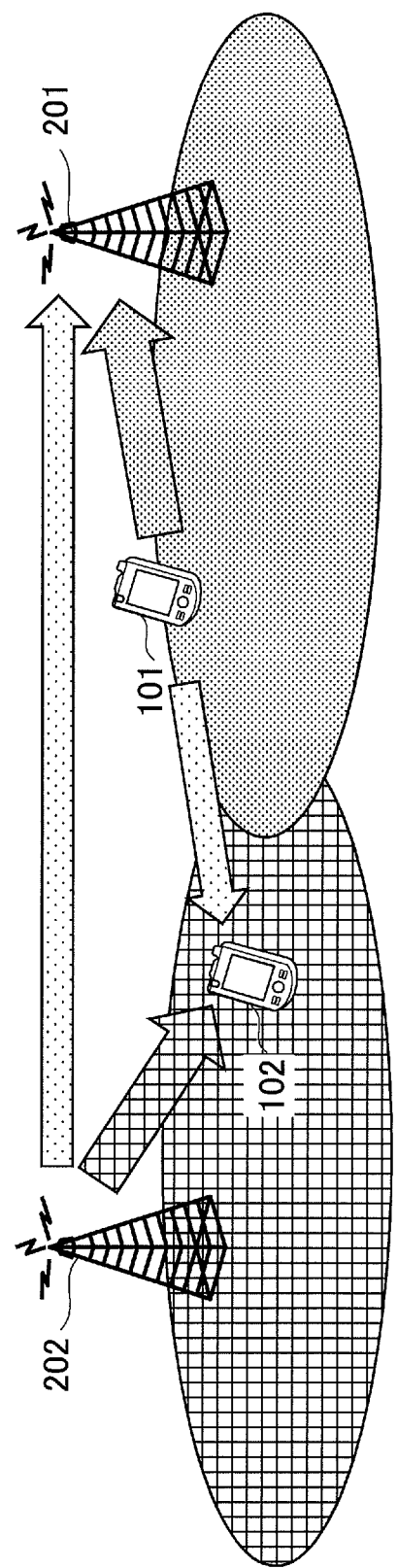

FIG.6C
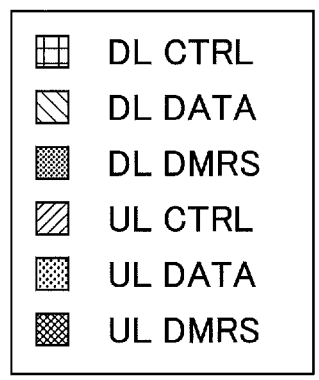

FIG.8B
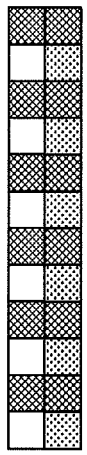
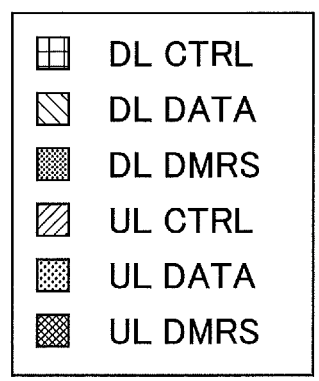

FIG.8C
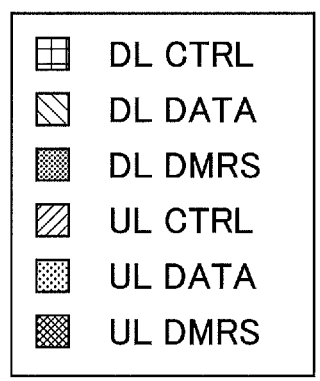

FIG.10B
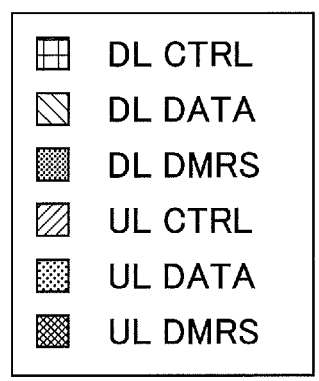

FIG.10C
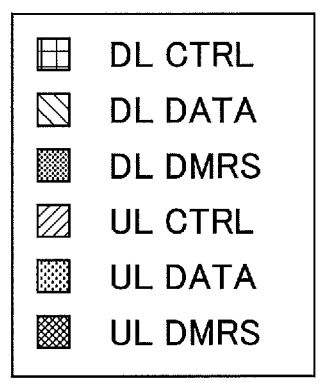

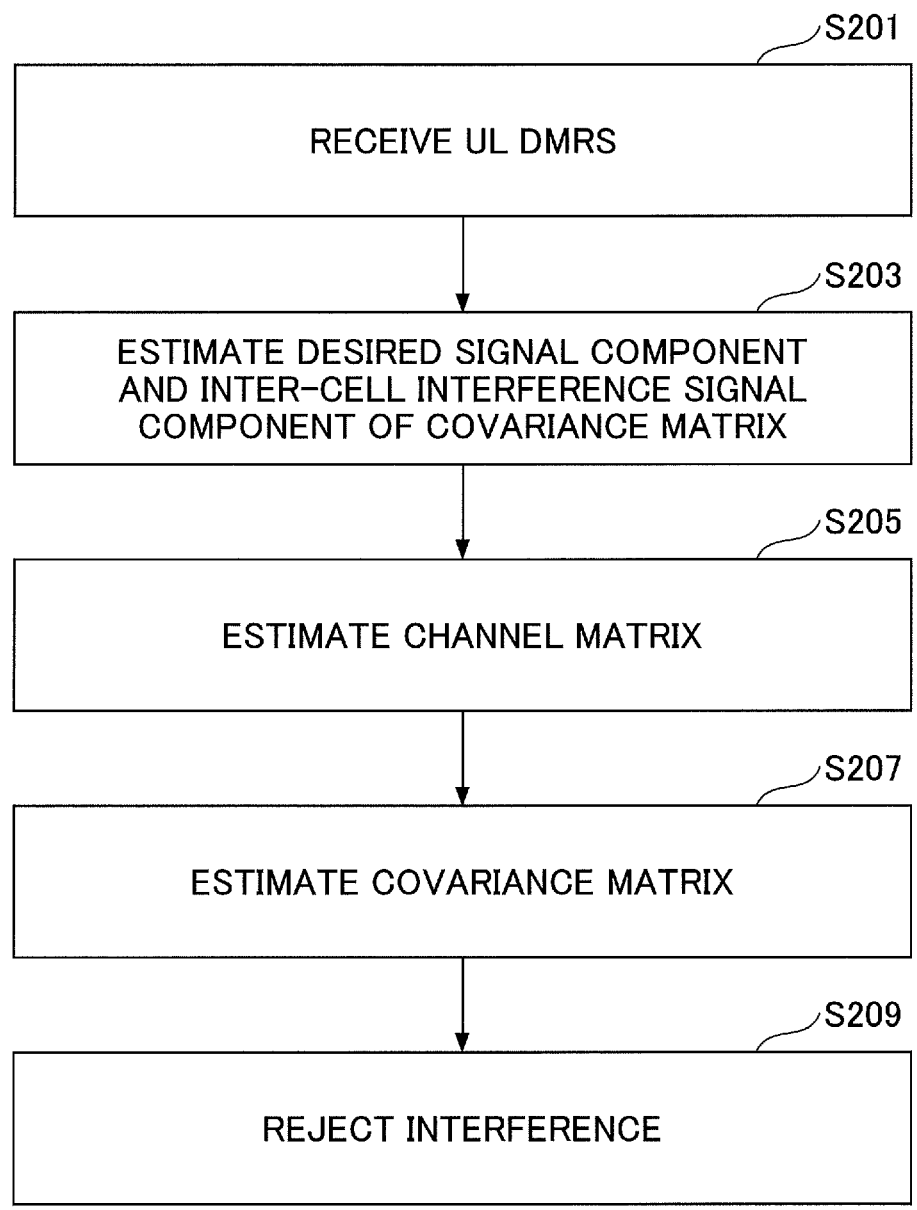

FIG.13B
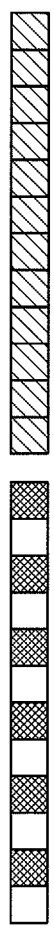
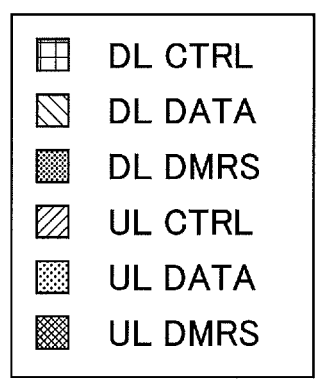

FIG.13C
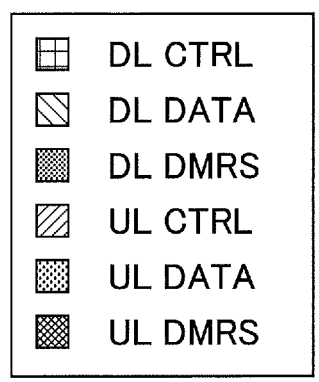

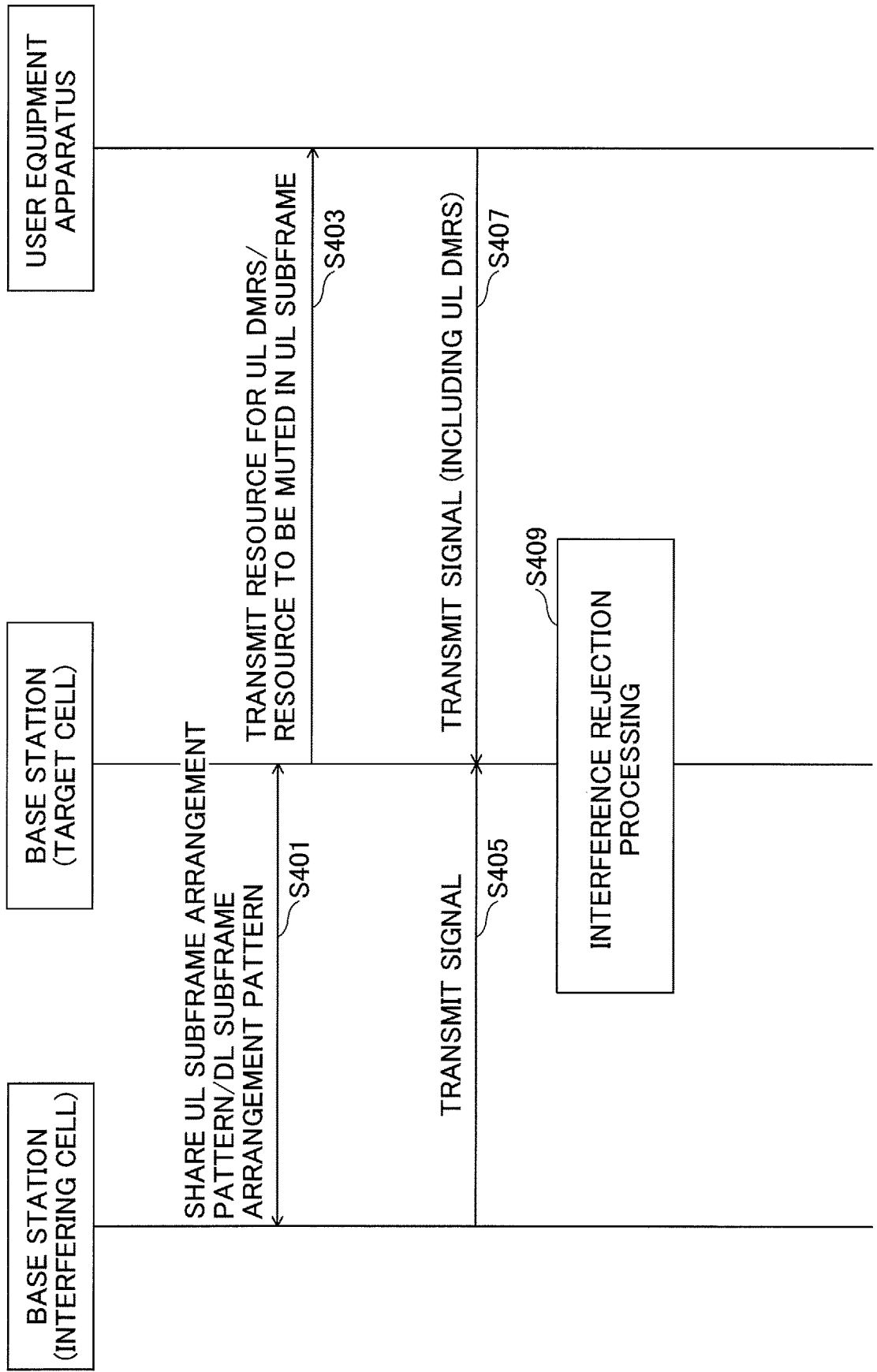

USER EQUIPMENT APPARATUS, BASE STATION, DEMODULATION REFERENCE SIGNAL TRANSMISSION METHOD

TECHNICAL FIELD

The present invention relates to a user equipment apparatus, a base station, and a demodulation reference signal transmission method.

BACKGROUND ART

In the Third Generation Partnership Project (3GPP), a next-generation communication standard (5G or NR) of a Long Term Evolution (LTE) system and an LTE-Advanced system is under discussion. In an NR system, flexible duplex that flexibly controls resources used for downlink communication and uplink communication according to generated downlink traffic and uplink traffic has been proposed. For example, dynamic time division duplex (TDD) that dynamically changes uplink resources and downlink resources in the time domain has been proposed (see Non-Patent Document 1).

Typically, it is estimated that the difference between downlink traffic and uplink traffic in a small cell is larger than that in a large cell. In such a case, it is possible to more efficiently accommodate traffic by independently controlling downlink communication and uplink communication in each cell using dynamic TDD.

In dynamic TDD, downlink and uplink communication directions are dynamically changed at time intervals such as subframes, slots, or mini-slots. According to static TDD applied in LTE, as illustrated in FIG. 1, a downlink/uplink pattern which is common to cells and is configured in advance is used. On the other hand, according to dynamic TDD, as illustrated in FIG. 2, an individual downlink/uplink pattern is used in each cell. Thus, downlink and uplink communication directions can be dynamically changed in each cell, depending on the amount of downlink traffic and the amount of uplink traffic.

PRIOR-ART DOCUMENTS

Non-Patent Documents

[Non-Patent Document 1] Bo Yu, Sayandev Mukherjee, Hiroyuki Ishii, "Dynamic TDD support in the LTE-B enhanced Local Area architecture", GC'12 Workshop: The 4th IEEE International Workshop on Heterogeneous and Small Cell Networks (HetSNets), December 2012
[Non-Patent Document 2] 3GPP TR 36.829 V11.1.0

DISCLOSURE OF INVENTION

Problem(s) to be Solved by the Invention

However, when the scheme that flexibly controls resources used for downlink communication and uplink communication in each cell is used, for example, downlink communication in a cell (referred to as an "interfering cell") interferes with uplink communication in another cell (referred to as a "target cell") and the possibility that a base station in the target cell cannot successfully receive an uplink signal from a user equipment apparatus increases.

It is assumed that, in the NR system, a demodulation reference signal (DMRS) or the like is used, as in the LTE system. A demodulation reference signal is used for channel estimation of a desired signal and is also used for interference rejection processing. Thus, when a communication apparatus (a user equipment apparatus or a base station) cannot successfully receive a demodulation reference signal in the target cell, neither interference rejection processing nor desired signal reception processing can be appropriately performed.

In the following, interference rejection processing is described (see Non-Patent Document 2).

A received signal in a resource element (RE) corresponding to a k-th subcarrier and an l-th symbol according to orthogonal frequency division multiplexing (OFDM) is expressed in the following equation.

$$r(k, l) = H_1(k, l)d_1(k, l) + \sum_{j=2}^{N_{UE}} H_j(k, l)d_j(k, l) + n(k, l)$$

In the equation, r(k,l) represents the received signal and is an $N_{RX}*1$ matrix. $N_{RX}$ is the number of reception antenna ports. Alternatively, $N_{RX}$ may be the number of reception antenna elements. $H_1(k,l)$ represents a channel between a base station and a user equipment apparatus (UE) in a target cell and is a $N_{RX}*N_{stream}$ matrix. $N_{stream}$ is the number of streams included in a desired signal. Alternatively, $N_{stream}$ may be the number of transmission antenna ports or the number of transmission antenna elements. $d_1(k,l)$ represents a signal transmitted from the UE in the target cell. $N_{UE}$ is the total number of UEs transmitting a signal in an interfering cell. $H_j(k,l)$ is a matrix representing a channel between a base station and a UE in a j-th interfering cell. $d_j(k,l)$ represents a signal transmitted in the interfering cell. n(k,l) represents a noise and is an $N_{RX}*1$ matrix.

An ideal minimum mean square error (MMSE) receiver weight for demodulating a received signal is expressed in the following equations.

$$W_{RX,1}(k, l) = \hat{H}_1^H(k, l)R^{-1}$$

$$R = P_1\hat{H}_1(k, l)\hat{H}_1^H(k, l) + \underbrace{\sum_{j=2}^{N_{UE}} H_j(k, l)H_j^H(k, l) + \sigma_n^2}_{\text{Interference covariance}}$$

In the equations, $WR_{X,1}(k,l)$ is a matrix representing the receiver weight.

$\hat{H}_1^H(k,l)$ is an estimation value of a channel matrix for a desired signal component. R is a covariance matrix for the received signal, the first term of the covariance matrix represents the desired signal component, and the second term represents an interference signal component. $P_1$ is a scalar representing transmission power per symbol.

However, implementing the ideal receiver weight increases a workload in the communication apparatus, because it is necessary to estimate a channel matrix not only for the desired signal component but also for the interference signal component. Thus, as described in Non-Patent Document 2, a receiver weight using DMRSs as expressed in the following equations may be used.

$$W_{RX,1}(k, l) = \hat{H}_1^H(k, l)R^{-1}$$

$$R = P_1 \hat{H}_1(k, l)\hat{H}_1^H(k, l) + \frac{1}{N_{sp}} \sum_{k,l \in DM-RS} \tilde{r}(k, l)\tilde{r}(k, l)^H$$

$$\tilde{r}(k, l) = r(k, l) - \hat{H}_1(k, l)d_1(k, l)$$

In the equations, $\tilde{r}(k,l)$ represents estimated DMRSs. $N_{sp}$ is the number of DMRSs.

In dynamic TDD, since downlink and uplink communication directions are dynamically changed, interference of downlink communication in the interfering cell with uplink communication in the target cell needs to be considered as described above. Thus, a received signal is expressed in the following equation.

$$r(k, l) = H_1(k, l)d_1(k, l) + \underbrace{\sum_{j=2}^{N_{UE\_UL}} H_j(k, l)d_j(k, l)}_{\text{Inter-cell interference}} + \underbrace{\sum_{i=2}^{N_{BS\_DL}} H_i(k, l)d_i(k, l)}_{\text{Inter-BS interference}} + n(k, l)$$

$N_{UE\_UL}$ is the total number of UEs transmitting a signal in the interfering cell where uplink communication is performed. $N_{BS\_DL}$ is the total number of UEs receiving a signal in the interfering cell where downlink communication is performed.

An ideal receiver weight for demodulating a received signal is expressed in the following equations.

$$W_{RX,1}(k, l) = \hat{H}_1^H(k, l)R^{-1}$$

$$R = P_1 \hat{H}_1(k, l)\hat{H}_1^H(k, l) + \underbrace{\sum_{j=2}^{N_{UE\_UL}} P_j \hat{H}_j(k, l)\hat{H}_j^H(k, l)}_{\text{Inter-cell interference covariance}} + \underbrace{\sum_{i=2}^{N_{BS\_DL}} P_i \hat{H}_i(k, l)\hat{H}_i^H(k, l)}_{\text{Cross-link interference covariance}} + \sigma_n^2$$

In the equations, $P_i$ and $P_j$ are scalars representing transmission power per symbol. In the equations, the first term of the covariance matrix represents a desired signal component, the second term represents an interference signal component caused by the interfering cell where uplink communication is performed while uplink communication is performed in the target cell, and the third term represents an interference signal component caused by the interfering cell where downlink communication is performed while uplink communication is performed in the target cell. Hereinafter, the second term is referred to as an "inter-cell interference signal component" and the third term is referred to as a "cross-link interference signal component".

When uplink communication and downlink communication are dynamically changed as in dynamic TDD, it is effective to define an MMSE receiver weight as expressed in these equations to reject both an inter-cell interference signal component and a cross-link interference signal component. Thus, it is necessary to provide a solution for a communication apparatus in a target cell to receive a demodulation reference signal in the target cell and reject interference including the cross-link interference signal component.

In view of the above-mentioned needs, in a radio communication system in which uplink communication and downlink communication are dynamically changed, it is an object of the present invention to provide a solution for a communication apparatus in a target cell to receive a demodulation reference signal in the target cell and reject interference including the cross-link interference signal component.

Means for Solving the Problem(s)

In one aspect of the present invention, there is provision for a user equipment apparatus in a radio communication system in which uplink communication and downlink communication are dynamically changed, including:

a reception unit configured to receive, from a base station, control information indicating a resource for an uplink demodulation reference signal in a subframe used for transmitting uplink data; and a transmitting unit configured to transmit the uplink demodulation reference signal according to the control information;

wherein the resource for the uplink demodulation reference signal is multiplexed into a part of resources corresponding to one or more symbols at a beginning of a data segment in the subframe used for transmitting the uplink data.

Advantageous Effect of the Invention

According to the present invention, in a radio communication system in which uplink communication and downlink communication are dynamically changed, a communication apparatus in a target cell can receive a demodulation reference signal in the target cell and reject interference including a cross-link interference signal component.

BRIEF DESCRIPTION OF THE DRAWINGS

FIG. 4 is a diagram illustrating an example of a subframe structure in dynamic TDD.
FIG. 5 is a diagram illustrating a UL interference pattern in a target cell.
FIG. 6C is a diagram illustrating an arrangement example 1-1 of DMRSs (arrangement example 2 of UL DMRSs).
FIG. 8B is a diagram illustrating another example of an arrangement example 1 of DMRSs (arrangement example 1 of UL DMRSs).
FIG. 8C is a diagram illustrating another example of an arrangement example 1 of DMRSs (arrangement example 2 of UL DMRSs).

FIG. 10B is a diagram illustrating an arrangement example 2-1 of DMRSs (arrangement example 1 of UL DMRSs).

FIG. 10C is a diagram illustrating an arrangement example 2-1 of DMRSs (arrangement example 2 of UL DMRSs).

FIG. 12 is a diagram illustrating interference rejection processing 2 in a base station of a target cell.

FIG. 13B is a diagram illustrating an arrangement example 3-1 of DMRSs (arrangement example 1 of UL DMRSs).

FIG. 13C is a diagram illustrating an arrangement example 3-1 of DMRSs (arrangement example 2 of UL DMRSs).

FIG. 16 is a diagram illustrating a sequence example in base stations and a user equipment apparatus.

DETAILED DESCRIPTION OF THE PREFERRED EMBODIMENTS

Hereinafter, an embodiment of the invention will be described with reference to the drawings. The following embodiment is merely an example and an embodiment to which the invention is applied is not limited to the following embodiment.

It is assumed that a radio communication system according to this embodiment supports at least an LTE communication system according to 3GPP Rel-8 or later. Thus, the existing technique defined in LTE can be used to operate the radio communication system as needed. However, the existing technique is not limited to LTE, but may include the technique defined in 5G or NR according to 3GPP Rel-15 or later. It is assumed that the term "LTE" used in the specification includes LTE-Advanced and systems beyond LTE-Advanced in a broad sense, unless otherwise specified. The invention can be also applied to communication systems other than LTE.

In this embodiment, while terms used in the existing LTE system such as "DMRS", "radio frame", "subframe", "slot", "RRC", and "UE" are used for convenience of description, these signals, functions, or the like may be differently termed.

<Structure of Radio Communication System>

Figure 1:
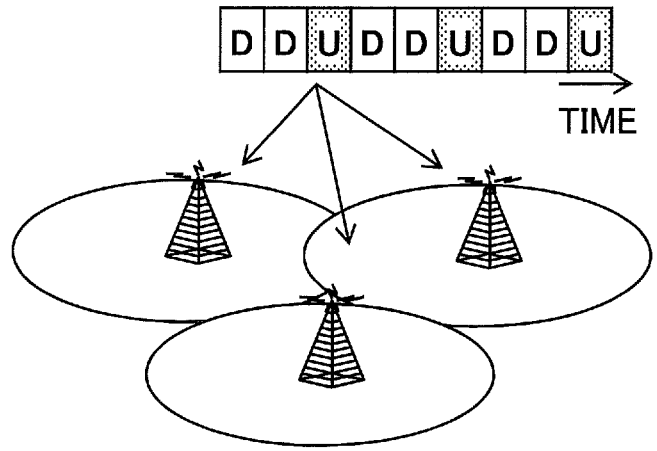
FIG. 1 is a diagram illustrating static TDD.
Figure 2:
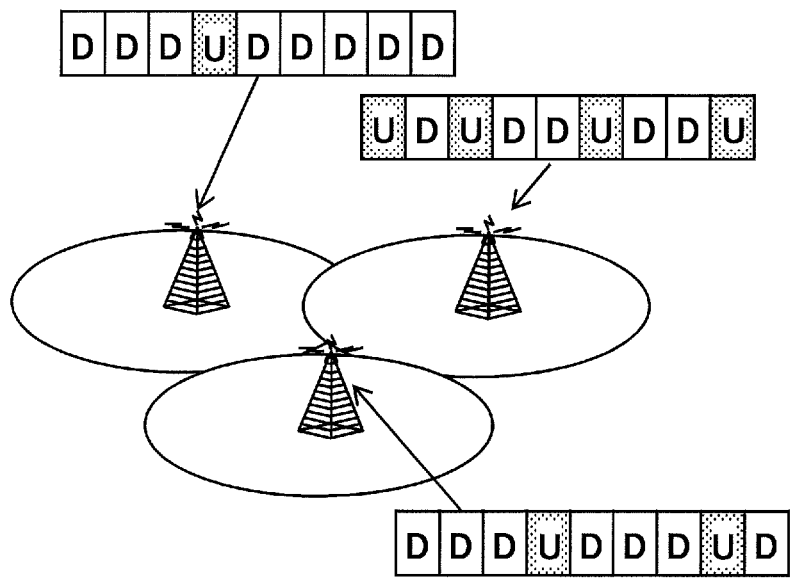
FIG. 2 is a diagram illustrating dynamic TDD.
Figure 3:
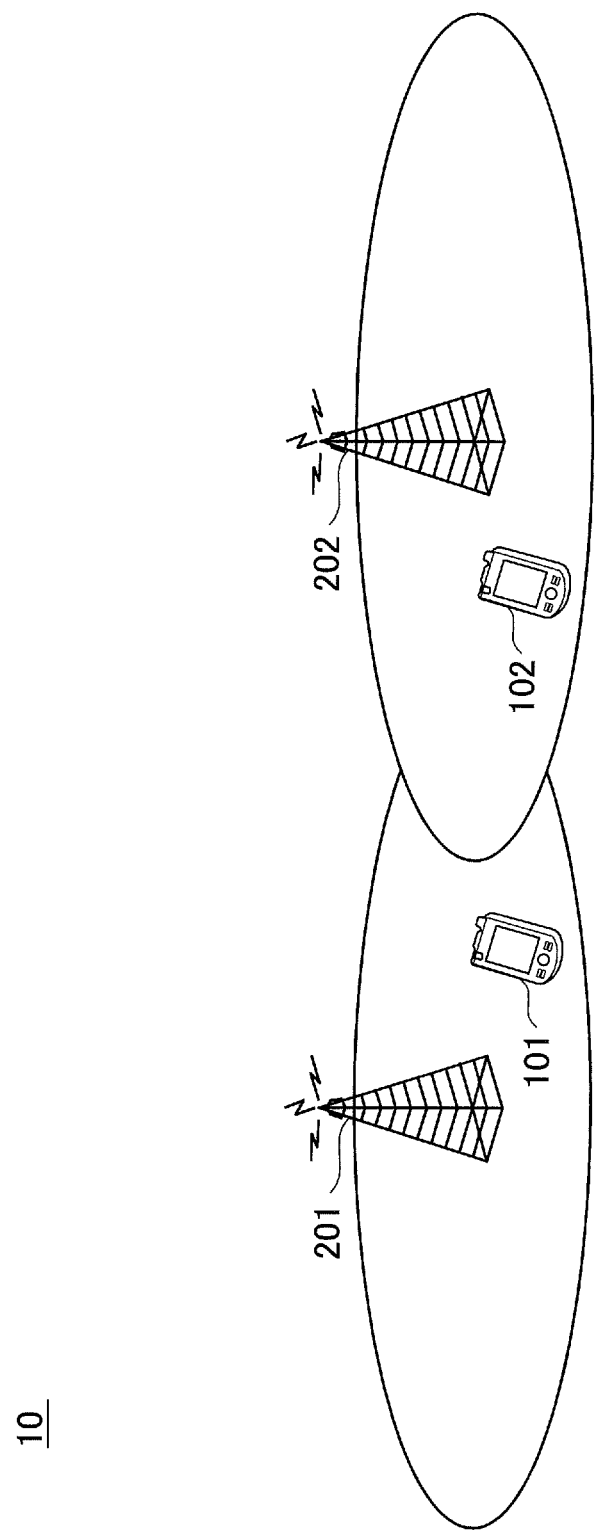
FIG. 3 is a diagram illustrating a radio communication system according to an embodiment of the present invention.

FIG. 3 is a diagram illustrating a structure of a radio communication system 10 according to this embodiment. As illustrated in FIG. 3, the radio communication system 10 according to this embodiment includes user equipment apparatuses 101 and 102 (hereinafter, collectively referred to as user equipment apparatuses 100) and base stations 201 and 202 (hereinafter, collectively referred to as base stations 200). In the following embodiment, as described above, the radio communication system 10 supports flexible duplex that flexibly controls resources used for UL communication and DL communication. Specifically, in this embodiment, dynamic TDD is mainly used as an example of the flexible duplex. It should be noted that the user equipment apparatus may be referred to as a "UE" and the base station may be referred to as a "BS".

The user equipment apparatus 100 is any communication apparatus with a radio communication function, such as a smart phone, a mobile phone, a tablet computer, a wearable terminal, or a machine-to-machine (M2M) communication module. The user equipment apparatus 100 is wirelessly connected to the base station 200 and uses various communication services provided by the radio communication system 10.

In some cases, the user equipment apparatus 100 is referred to as a mobile station, a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or any other suitable term by those skilled in the art.

The base station 200 is a communication apparatus that provides one or more cells and wirelessly communicates with the user equipment apparatus 100. In the example illustrated in FIG. 3, two base stations 201 and 202 are illustrated. However, in general, a large number of base stations 200 are provided so as to cover the service area of the radio communication system 10.

The base station 200 can accommodate one or more (for example, three) cells (also referred to as "sectors"). When the base station accommodates a plurality of cells, the entire coverage area of the base station can be divided into a plurality of small areas, and in each small area, a communication service can be provided through a base station subsystem (for example, a small indoor base station remote radio head (RRH)). The term "cell" or "sector" refers to a part or whole of the coverage area in which the base station and/or the base station subsystem provides a communication service. Further, the terms "base station", "eNB", "cell", and "sector" may be used interchangeably in this specification. In some cases, the base station eNB is also referred to as a fixed station, a NodeB, an eNodeB (eNB), an access point, a femto cell, a small cell, or the like.

In the radio communication system 10 according to this embodiment, it is assumed that cells are synchronized with each other. In other words, it is assumed that the boundaries between time frames (radio frames, subframes, slots, mini-slots, or the like) coincide with each other among the cells.

<Structure of Dynamic TDD>

As described above, in this embodiment, dynamic TDD is used as an example. Thus, an example of the structure of the dynamic TDD according to this embodiment will be described.

As illustrated in FIG. 4, in this example, one subframe includes a head time segment (hereinafter, referred to as a "DL control CH segment") for a downlink control channel, a time segment (hereinafter, referred to as a "data segment") for data communication, and a tail time segment (hereinafter, referred to as a "UL control CH segment") for an uplink control channel. In addition, a guard period (GP) for switching is provided at the boundary between DL and UL.

It should be noted that the subframe may be a slot, or may be a time frame other than the subframe and the slot. The subframe may be referred to as a "transmission time interval (TTI)". In addition, the time length of the subframe may be a fixed time length that does not change over time or a time length that varies depending on a packet size, subcarrier spacing, and/or the like. When a plurality of continuous subframes are used for data communication depending on a packet size or the like, the plurality of continuous subframes may be regarded as one "subframe".

A radio frame may be formed by one or more frames in the time domain. Each of one or more frames in the time domain is also referred to as a "subframe". Further, the subframe may be formed by one or more slots in the time domain. Further, the slot may be formed by one or more symbols (OFDM symbols, SC-FDMA symbols, or the like) in the time domain. Each of the radio frame, the subframe, the slot, and the symbol represents a time unit in which a signal is transmitted. The radio frame, the subframe, the slot, and the symbol may have different corresponding names.

For example, in an LTE system, a base station performs scheduling to allocate a radio resource (a frequency bandwidth, transmission power, or the like which can be used by each mobile station) to each mobile station. A minimum time unit of scheduling may be referred to as a "transmission time interval (TTI)". For example, one subframe may be referred to as a TTI, a plurality of consecutive subframes may be referred to as a TTI, or one slot may be referred to as a TTI.

A resource block (RB) is a resource allocation unit in the time domain and the frequency domain and may include one or more consecutive subcarriers in the frequency domain. In the time domain of the resource block, one or more symbols may be included, and one slot, one subframe, or one TTI may be used. Each of one TTI and one subframe may be formed by one or more resource blocks.

The structure of the radio frame as described above is merely an example, and the number of subframes included in the radio frame, the number of slots included in the subframe, the number of symbols and resources blocks included in the slot, and the number of subcarriers included in the resource block can be modified in any manner.

<Principle of Interference Rejection Operation>

In this embodiment, in a target cell (may be also referred to as a "serving cell"), the base station 200 can reject interference with another cell (interfering cell) based on a DMRS transmitted from the user equipment apparatus 100 in the target cell. Before describing a solution to achieve interference rejection, an interference pattern in dynamic TDD will be described with reference to FIG. 5. FIG. 5 illustrates base stations 201 and 202 and user equipment apparatuses 101 and 102. It is assumed that a cell of the base station 201 is a target cell and a cell of the base station 202 is an interfering cell.

It is assumed that UL communication (that is, signal transmission from the user equipment apparatus 101 to the base station 201) is performed in the target cell and DL communication (that is, signal transmission from the base station 202 to the user equipment apparatus 102) is performed in the interfering cell. Since transmission power of the base station 202 is typically higher than that of the user equipment apparatus 101, a DL signal in the interfering cell significantly interferes with a UL signal in the target cell.

Reception beam forming (a reception beam is directed toward the arrival direction of an interference signal, that is, null is formed in the arrival direction) is an effective way in reducing interference. Specifically, for example, the base station 201 (including a plurality of antennas) is provided with an MMSE-IRC receiver disclosed in Non-Patent Document 2 to reduce interference with an adjacent cell. The MMSE-IRC receiver estimates statistical properties of interference with the adjacent cell as well as channel information of a desired signal, using a UL DMRS, adjusts the phase of each received signal such that null of an antenna gain is created in the arrival direction of the interference with the adjacent cell based on the estimation, and combines signals.

Next, the arrangement of UL DMRSs in the target cell, the arrangement of DL DMRSs in the interfering cell, and interference rejection processing are described with reference to FIGS. 6-15. It should be noted that a reference signal (RS) may be referred to as a "pilot" depending on the applied standard.

In each of the figures illustrating the following arrangement examples, a UL subframe in the target cell and a DL subframe in the interfering cell are illustrated. These subframes are located at same positions in time. While one UL subframe in the target cell and one DL subframe in the interfering cell are illustrated, the arrangement of DMRSs is basically the same in the subframes at other positions in time. The DMRS may either be transmitted from the communication apparatus only when data are transmitted/received or be transmitted from the communication apparatus when no data are transmitted/received, unless otherwise specified.

<Arrangement Example 1 of DMRSs>

Figure 6A:
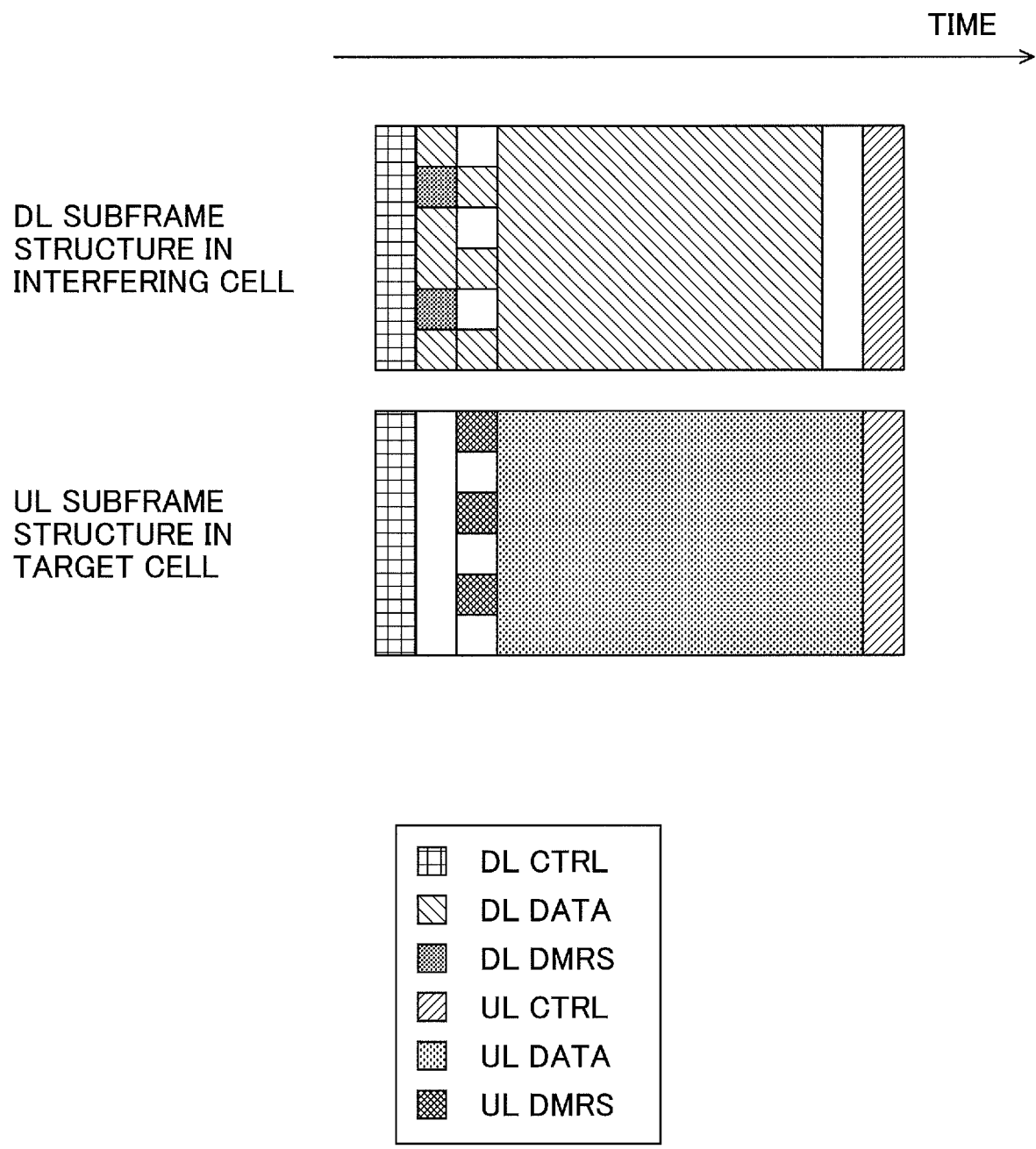
FIG. 6A is a diagram illustrating an arrangement example 1-1 of DMRSs (subframe structure).

FIG. 6A illustrates an arrangement example 1-1 of DMRSs. As illustrated in FIG. 6A, UL DMRSs in the target cell are multiplexed into a part of resources corresponding to a symbol at the beginning of a data segment following a guard period in the UL subframe. While the UL DMRSs are multiplexed into the first of the symbols in FIG. 6A, the UL DMRSs may be multiplexed into the first multiple (two or more) symbols. In the one or more symbols at the beginning of the data segment, resources into which the UL DMRSs are not multiplexed are muted. In other words, at the time in which the UL DMRSs are transmitted, UL data are not transmitted.

DL DMRSs in the interfering cell are multiplexed into a part of resources corresponding to a symbol at the beginning of a data segment. In the symbol at the beginning of the data segment, resources into which the DL DMRSs are not multiplexed may be used for DL data. In addition, resources in the DL subframes corresponding to the resources for the UL DMRSs are muted. In other words, at the time and frequency in which the UL DMRSs are transmitted, DL data are not transmitted.

Figure 6B:
FIG. 6B is a diagram illustrating an arrangement example 1-1 of DMRSs (arrangement example 1 of UL DMRSs).

As illustrated in FIGS. 6B and 6C, it is possible to make various patterns of arranging resources into which UL DMRSs are multiplexed and resources which are muted. As illustrated in FIG. 6B, resources into which UL DMRSs are multiplexed and resources which are muted may be arranged discretely in the frequency direction. Alternatively, as illustrated in FIG. 6C, resources into which UL DMRSs are multiplexed and resources which are muted may be arranged in two or more continuous resources in the frequency direction. Alternatively, a combination of the discrete arrangement and the continuous arrangement may be used. Since the resources into which the UL DMRSs are multiplexed and the resources which are muted are used to estimate a desired signal component, an inter-cell interference signal component, and a cross-link interference signal component of the covariance matrix as described below, it is preferable that the number of the former resources be the same as the number of the latter resources. However, the number of the former resources may be different from the number of the latter resources.

Figure 7:
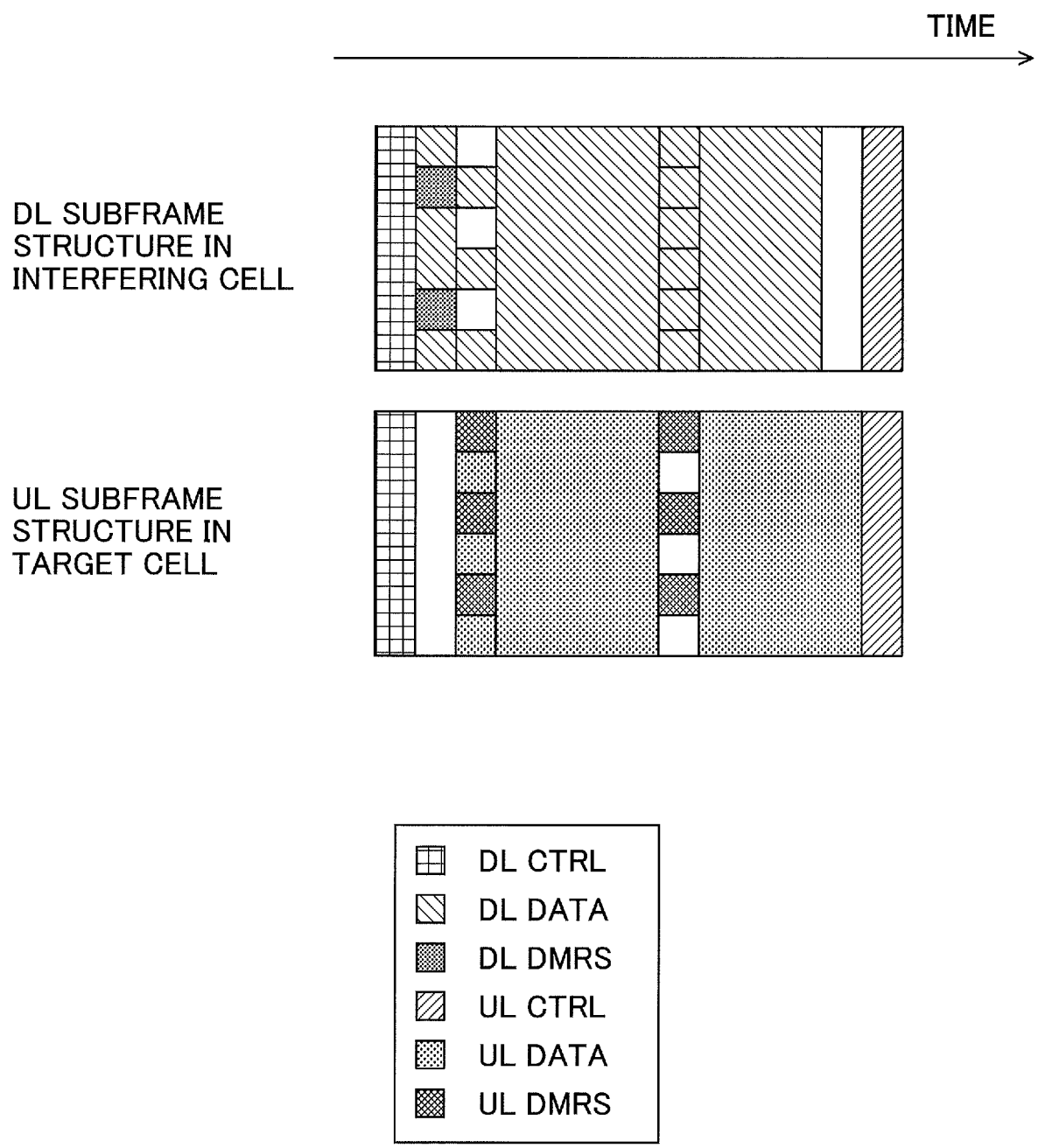
FIG. 7 is a diagram illustrating an arrangement example 1-2 of DMRSs.

FIG. 7 illustrates an arrangement example 1-2 of DMRSs. As illustrated in FIG. 7, UL DMRSs in the target cell are multiplexed into a part of resources corresponding to a symbol at the beginning of a data segment following a guard period in the UL subframe. In the symbol at the beginning of the data segment, resources into which the UL DMRSs are not multiplexed may be used for UL data. In addition, UL DMRSs are also multiplexed into a part of resources corresponding to a symbol at the midpoint of the data segment. While the UL DMRSs are multiplexed into the first of the symbols and into the midpoint of the symbols in FIG. 7, the UL DMRSs may be multiplexed into the first multiple (two or more) symbols and into multiple symbols at the midpoint. In the one or more symbols at the midpoint of the data segment, resources into which the UL DMRSs are not multiplexed are muted. In other words, at the time in which the UL DMRSs are transmitted at the midpoint of the data segment, UL data are not transmitted.

DL DMRSs in the interfering cell are multiplexed into a part of resources corresponding to a symbol at the beginning of a data segment. In the symbol at the beginning of the data segment, resources into which the DL DMRSs are not multiplexed may be used for DL data. In addition, resources in the DL subframe corresponding to the resources for the UL DMRSs in the symbol at the beginning of the data segment are muted. In other words, at the time and frequency in which UL DMRSs are transmitted in the symbol at the beginning of the data segment, DL data are not transmitted.

It should be noted that in FIG. 6A, UL DMRSs may be multiplexed into a part of resources corresponding to a symbol at the midpoint of the data segment. When UL DMRSs are arranged in a plurality of resources in the time direction, the tracking error of channel matrix estimation in the time direction can be reduced.

Figure 8A:
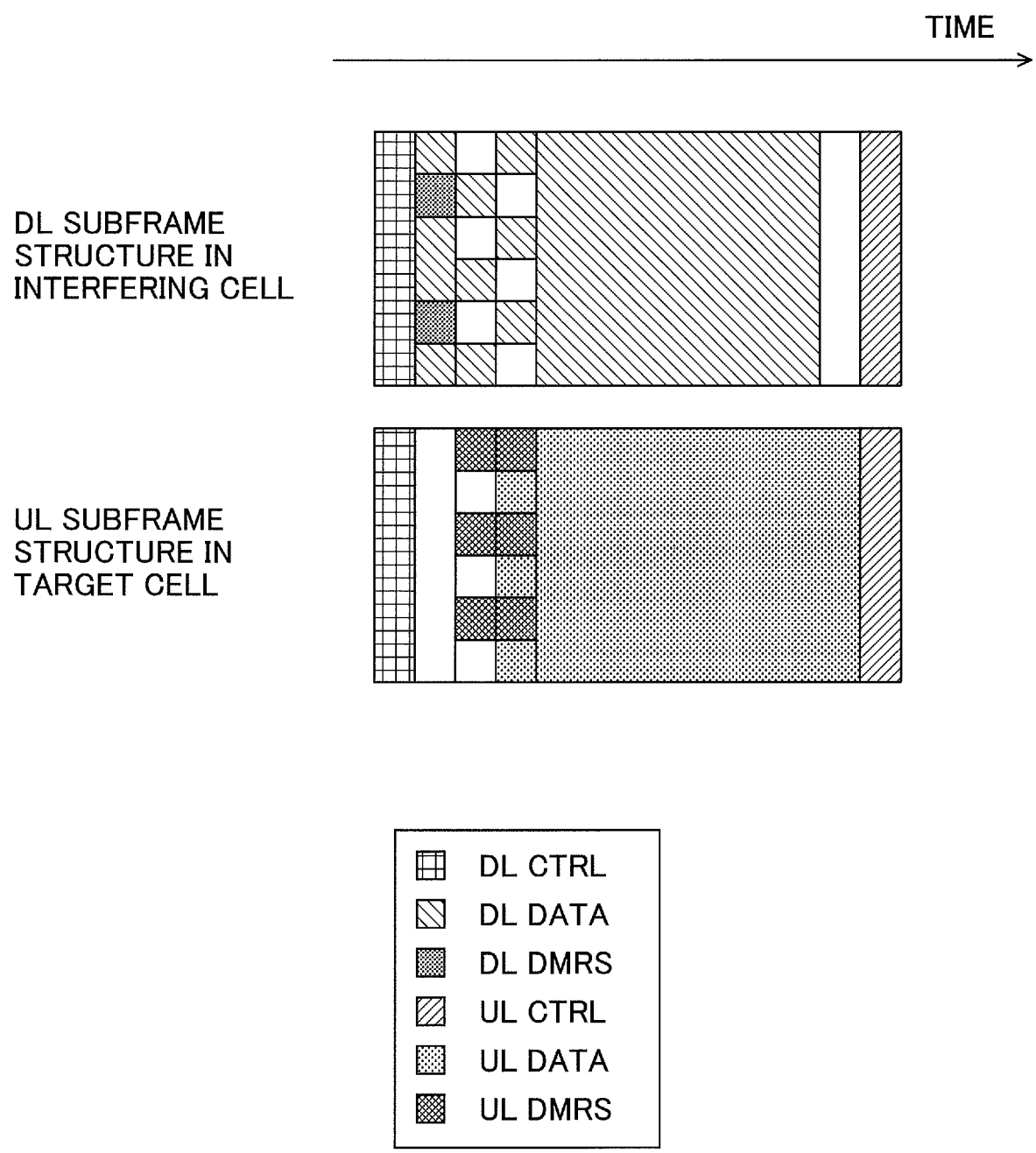
FIG. 8A is a diagram illustrating another example of an arrangement example 1 of DMRSs (subframe structure).

It is possible to make various patterns of arranging UL DMRSs. As illustrated in FIG. 8A, UL DMRSs may be multiplexed into the first multiple symbols in the data segment and resources in the first symbol in the data segment may be muted. Alternatively, in a plurality of symbols in the DL subframe, while the UL DMRSs are transmitted, resources corresponding to the resources for the UL DMRSs may not be always muted, and a combination of muted resources and resources for DL data is arranged in the resources corresponding to the resources for the UL DMRSs.

As illustrated in FIGS. 8B and 8C, it is possible to make various patterns of arranging resources into which UL DMRSs are multiplexed and resources which are muted. As illustrated in FIG. 8B, resources into which UL DMRSs are multiplexed and resources which are muted may be arranged discretely in the frequency direction. Alternatively, as illustrated in FIG. 8C, resources into which UL DMRSs are multiplexed and resources which are muted may be arranged in two or more continuous resources in the frequency direction. Alternatively, a combination of the discrete arrangement and the continuous arrangement may be used.

<Interference Rejection Processing 1>

Figure 9:
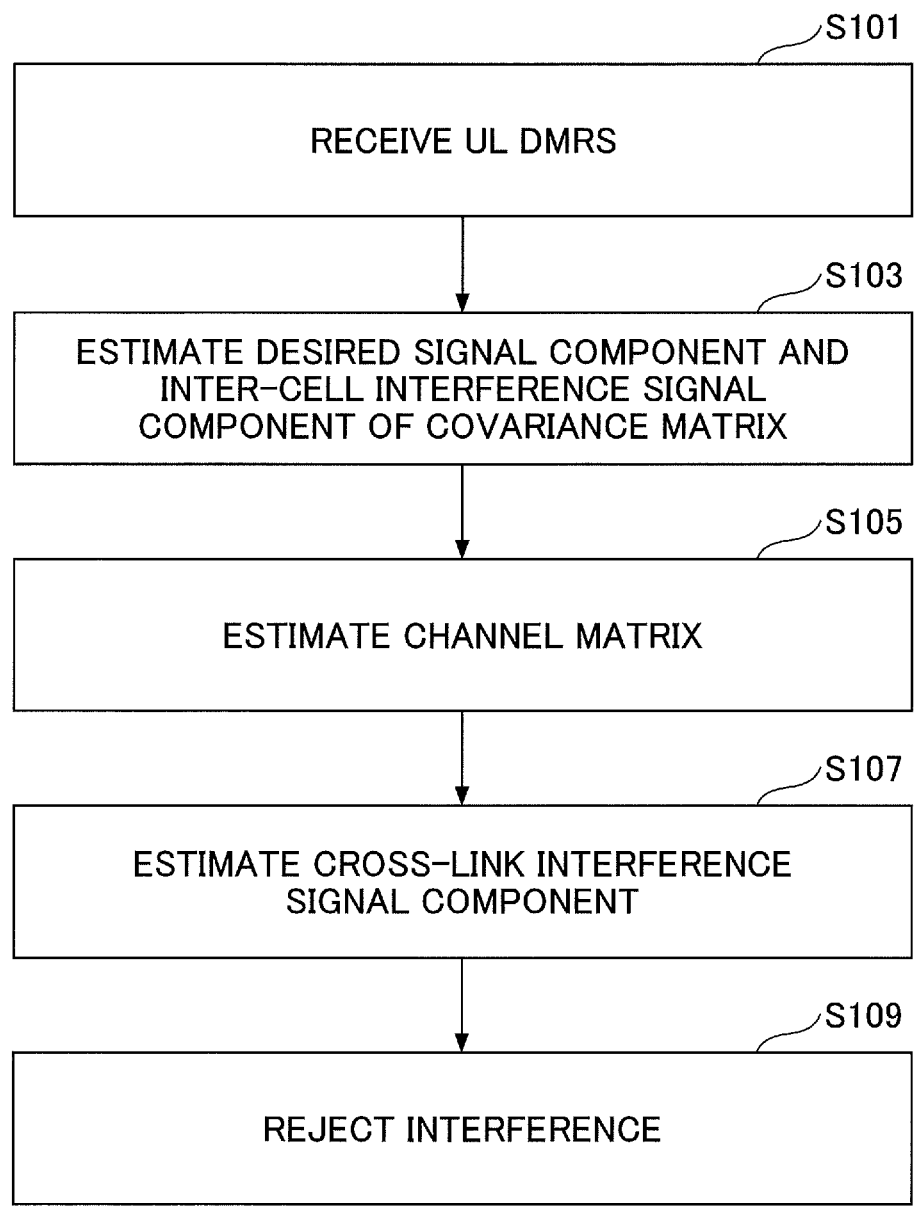
FIG. 9 is a diagram illustrating interference rejection processing 1 in a base station of a target cell.

FIG. 9 illustrates interference rejection processing 1 in a base station of a target cell when the arrangement example 1 is used.

First, the base station receives UL DMRSs (S101) and estimates a desired signal component and an inter-cell interference signal component of a covariance matrix (S103). In the arrangement 1, since resources in the DL subframe corresponding to the resources for UL DMRSs are muted as described above, there is no cross-link interference signal component in the muted resources. Thus, the desired signal component and the inter-cell interference signal component can be estimated according to the following equations.

$$R = P_1 \hat{H}_1(k,l) \hat{H}_1^H(k,l) + \underbrace{\sum_{j=2}^{N_{UE\_UL}} P_j \hat{H}_j(k,l) \hat{H}_j^H(k,l)}_{\text{Inter-cell interference covariance}} + \sigma^2 \approx$$

$$\frac{1}{N_{DMRS}} \sum_{k,l \in DMRS} \tilde{r}(k,l) \tilde{r}(k,l)^H$$

$$\tilde{r}(k,l) = \sum_{j=1}^{N_{UE\_UL}} H_j(k,l) s_j(k,l) + n$$

In these equations, $P_i$ and $P_j$ are scalars representing transmission power per symbol. $\hat{H}_1(k,l)$ represents a channel between the base station and a user equipment apparatus (UE) in the target cell. $H_j(k,l)$ is a matrix representing a channel between a base station and a UE in a j-th interfering cell. $N_{UE\_UL}$ is the total number of UEs transmitting a signal in the interfering cell where uplink communication is performed. $N_{DMRS}$ is the number of DMRSs to be averaged. The DMRSs may be averaged in any manner. For example, UL DMRSs included in one or more resource blocks may be averaged. $s_j(k,l)$ represents a signal transmitted from the UE in the target cell. n represents a noise.

Then, the base station calculates an estimation value of a channel matrix $\hat{H}_1(k,l)$ in the target cell (S105).

Since the resources in the UL subframe are muted, the base station can estimate a cross-link interference signal component of the covariance matrix according to the following equations (S107).

$$R = \underbrace{\sum_{i=1}^{N_{BS\_DL}} P_i \hat{H}_i(k,l) \hat{H}_i^H(k,l)}_{\text{Cross-link interference covariance}} + \sigma^2 \approx \frac{1}{N_{muted}} \sum_{k,l \in Muted\ UL\ REs} y(k,l) y(k,l)^H$$

$$y(k,l) = \sum_{i=2}^{N_{BS\_DL}} H_i(k,l) d_i(k,l) + n$$

In these equations, $N_{BS\_DL}$ is the total number of UEs receiving a signal in the interfering cell where downlink communication is performed. $P_1$ is a scalar representing transmission power per symbol. $N_{muted}$ is the number of muted resources. $d_i(k,l)$ represents a signal transmitted in the interfering cell.

The base station rejects interference using the result of step S107 (S109).

<Arrangement Example 2 of DMRSs>

Figure 10A:
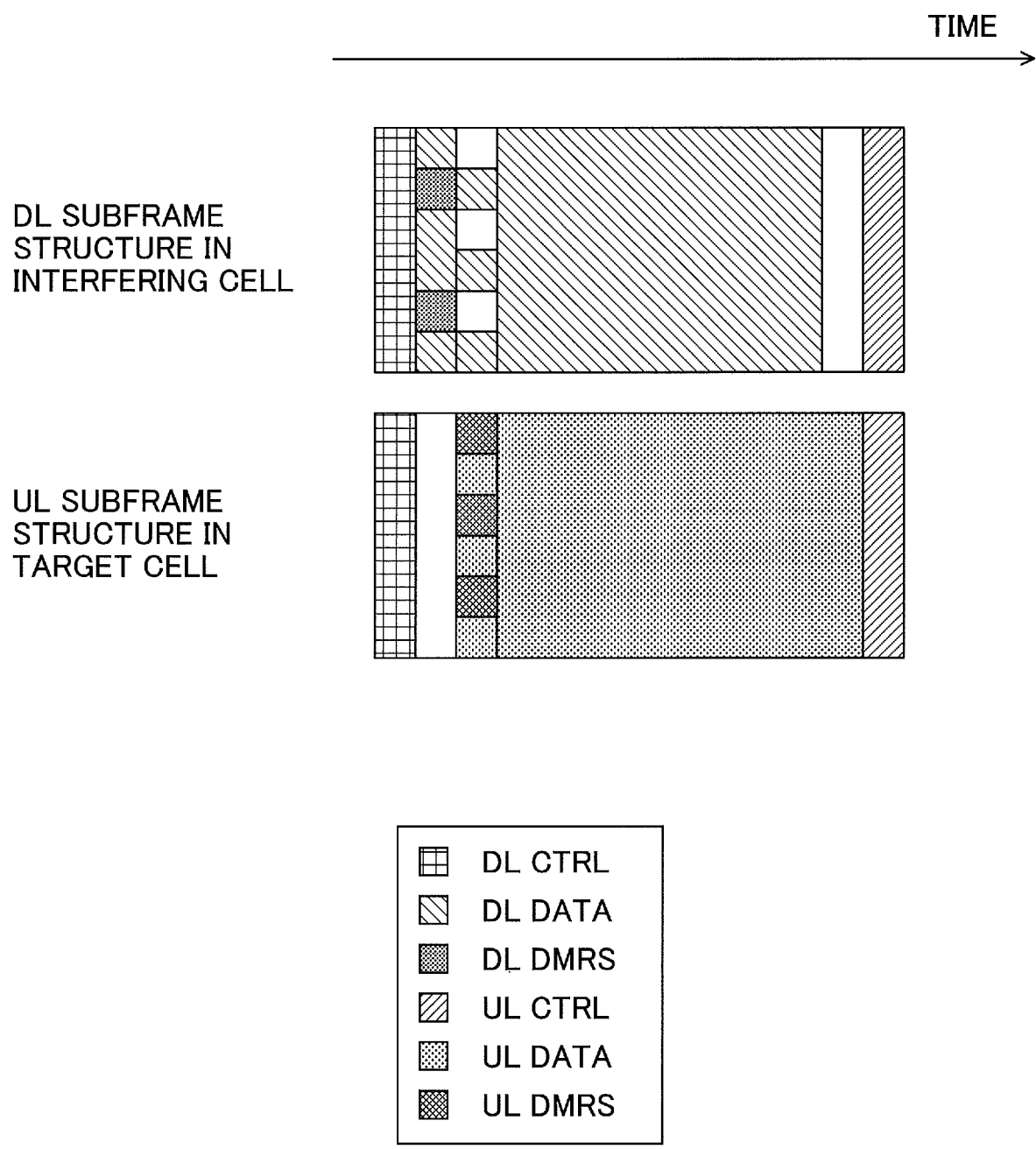
FIG. 10A is a diagram illustrating an arrangement example 2-1 of DMRSs (subframe structure).

FIG. 10A illustrates an arrangement example 2-1 of DMRSs. As illustrated in FIG. 10A, UL DMRSs in the target cell are multiplexed into a part of resources corresponding to a symbol at the beginning of a data segment following a guard period in the UL subframe. While the UL DMRSs are multiplexed into the first of the symbols in FIG. 10A, the UL DMRSs may be multiplexed into the first multiple (two or more) symbols. In the one or more symbols at the beginning of the data segment, for resources into which the UL DMRSs are not multiplexed, UL data may be transmitted.

DL DMRSs in the interfering cell are multiplexed into a part of resources corresponding to a symbol at the beginning of a data segment. In the symbol at the beginning of the data segment, resources into which the DL DMRSs are not multiplexed may be used for DL data. In addition, resources in the DL subframes corresponding to the resources for the UL DMRSs are muted. In other words, at the time and frequency in which the UL DMRSs are transmitted, DL data are not transmitted.

As illustrated in FIGS. 10B and 10C, it is possible to make various patterns of arranging resources into which UL DMRSs are multiplexed and resources which are muted. As illustrated in FIG. 10B, resources into which UL DMRSs are multiplexed and resources which are muted may be arranged discretely in the frequency direction. Alternatively, as illustrated in FIG. 10C, resources into which UL DMRSs are multiplexed and resources which are muted may be arranged in two or more continuous resources in the frequency direction. Alternatively, a combination of the discrete arrangement and the continuous arrangement may be used.

Figure 11:
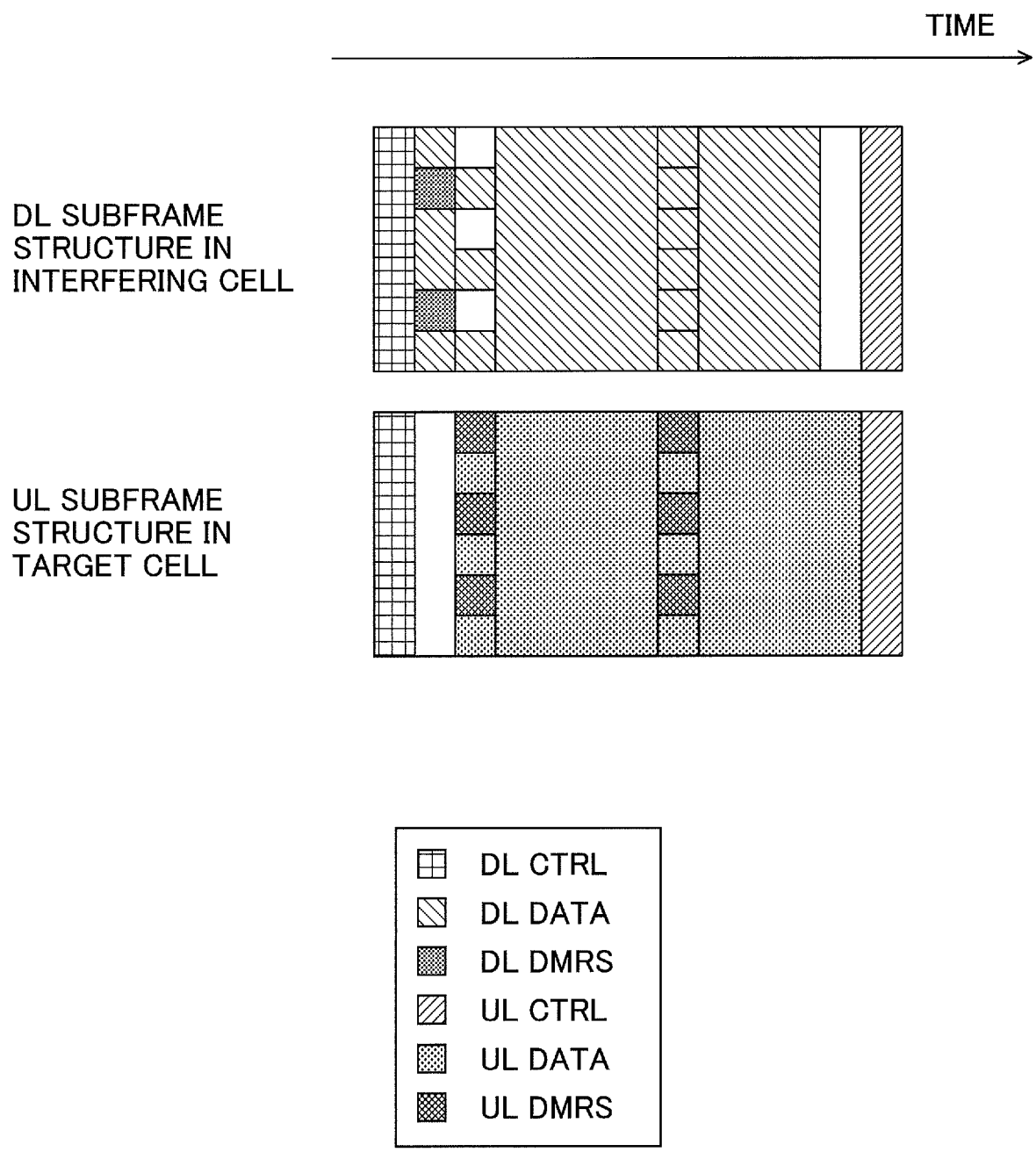
FIG. 11 is a diagram illustrating an arrangement example 2-2 of DMRSs.

FIG. 11 illustrates an arrangement example 2-2 of DMRSs. As illustrated in FIG. 11, UL DMRSs in the target cell are multiplexed into a part of resources corresponding to a symbol at the beginning of a data segment following a guard period in the UL subframe. In the symbol at the beginning of the data segment, resources into which the UL DMRSs are not multiplexed may be used for UL data. In addition, UL DMRSs are also multiplexed into a part of resources corresponding to a symbol at the midpoint of the data segment. While the UL DMRSs are multiplexed into the first of the symbols and into the midpoint of the symbols in FIG. 11, the UL DMRSs may be multiplexed into the first multiple (two or more) symbols and into multiple symbols at the midpoint. In the one or more symbols at the midpoint of the data segment, resources into which the UL DMRSs are not multiplexed may be used for UL data.

DL DMRSs in the interfering cell are multiplexed into a part of resources corresponding to a symbol at the beginning of a data segment. In the symbol at the beginning of the data segment, resources into which the DL DMRSs are not multiplexed may be used for DL data. In addition, resources in the DL subframe corresponding to the resources for the UL DMRSs in the symbol at the beginning of the data segment are muted. In other words, at the time and frequency in which UL DMRSs are transmitted in the symbol at the beginning of the data segment, DL data are not transmitted. It should be noted that in the symbol at the midpoint of the data segment rather than in the symbol at the beginning of the data segment, resources in the DL subframe corresponding to the resources for the UL DMRSs may be muted.

It should be noted that in FIG. 10A, UL DMRSs may be multiplexed into a part of resources corresponding to a symbol at the midpoint of the data segment. When UL DMRSs are arranged in a plurality of resources in the time direction, the tracking error of channel matrix estimation in the time direction can be reduced.

<Interference Rejection Processing 2>

FIG. 12 illustrates interference rejection processing 2 in a base station of a target cell when the arrangement example 2 is used.

First, the base station receives UL DMRSs (S201) and estimates a desired signal component and an inter-cell interference signal component of a covariance matrix (S203). In the arrangement 2, since resources in the DL subframe corresponding to the resources for UL DMRSs are muted as described above, there is no cross-link interference signal component in the muted resources. Thus, the desired signal component and the inter-cell interference signal component can be estimated according to the following equations.

$$R = P_1 \hat{H}_1(k, l) \hat{H}_1^H(k, l) + \sum_{j=2}^{N_{UE\_UL}} P_j \hat{H}_j(k, l) \hat{H}_j^H(k, l) + \sigma^2 \approx$$

$$\underbrace{\phantom{\sum_{j=2}^{N_{UE\_UL}} P_j \hat{H}_j(k, l) \hat{H}_j^H(k, l)}}_{\text{Inter-cell interference covariance}}$$

$$\frac{1}{N_{DMRS}} \sum_{k, l \in DMRS} \tilde{r}(k, l) \tilde{r}(k, l)^H$$

$$\tilde{r}(k, l) = \sum_{j=1}^{N_{UE\_UL}} H_j(k, l) s_j(k, l) + n$$

Then, the base station calculates an estimation value of a channel matrix $\hat{H}_1(k,l)$ in the target cell (S205).

In contrast to the arrangement example 1, in the arrangement example 2, the base station cannot directly estimate only a cross-link interference signal component of the covariance matrix. Thus, the base station calculates the sum of the desired signal component, the inter-cell interference signal component, and the cross-link interference signal component from a UL data signal. Specifically, the base station calculates the sum according to the following equations (S207).

$$\hat{R} \approx \frac{1}{N_{UL\_RE}} \sum_{k, l \in UL\ REs} y(k, l) y(k, l)^H$$

$$y(k, l) = \sum_{j=1}^{N_{UE\_UL}} H_j(k, l) d_j(k, l) + \sum_{i=2}^{N_{BS\_DL}} H_i(k, l) d_i(k, l) + n$$

In the equations, $N_{UL\_RE}$ is the number of uplink resource elements to be averaged. The uplink resource elements may be averaged in any manner. For example, data signals included in one or more resource blocks may be averaged.

The base station rejects interference using the result of step S207 (S209).

<Arrangement Example 3 of DMRSs>

Figure 13A:
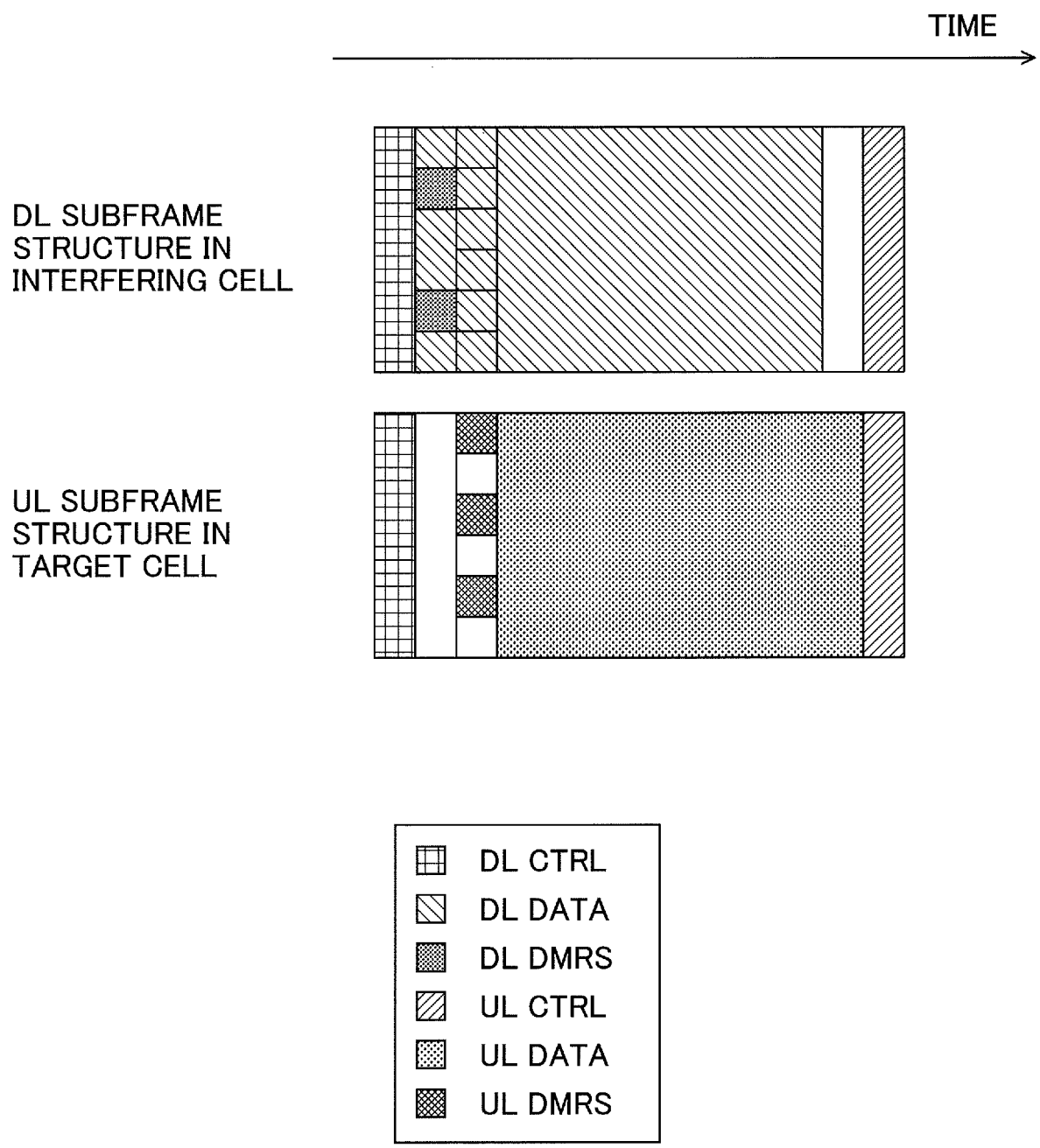
FIG. 13A is a diagram illustrating an arrangement example 3-1 of DMRSs (subframe structure).

FIG. 13A illustrates an arrangement example 3-1 of DMRSs. As illustrated in FIG. 13A, UL DMRSs in the target cell are multiplexed into a part of resources corresponding to a symbol at the beginning of a data segment following a guard period in the UL subframe. While the UL DMRSs are multiplexed into the first of the symbols in FIG. 13A, the UL DMRSs may be multiplexed into the first multiple (two or more) symbols. In the one or more symbols at the beginning of the data segment, resources into which the UL DMRSs are not multiplexed are muted. In other words, at the time in which the UL DMRSs are transmitted, UL data are not transmitted.

DL DMRSs in the interfering cell are multiplexed into a part of resources corresponding to a symbol at the beginning of a data segment. In the symbol at the beginning of the data segment, resources into which the DL DMRSs are not multiplexed may be used for DL data. In the data segment, resources are not muted and may be used for DL data.

As illustrated in FIGS. 13B and 13C, it is possible to make various patterns of arranging resources into which UL DMRSs are multiplexed and resources which are muted. As illustrated in FIG. 13B, resources into which UL DMRSs are multiplexed and resources which are muted may be arranged discretely in the frequency direction.

Alternatively, as illustrated in FIG. 13C, resources into which UL DMRSs are multiplexed and resources which are muted may be arranged in two or more continuous resources in the frequency direction. Alternatively, a combination of the discrete arrangement and the continuous arrangement may be used.

Figure 14:
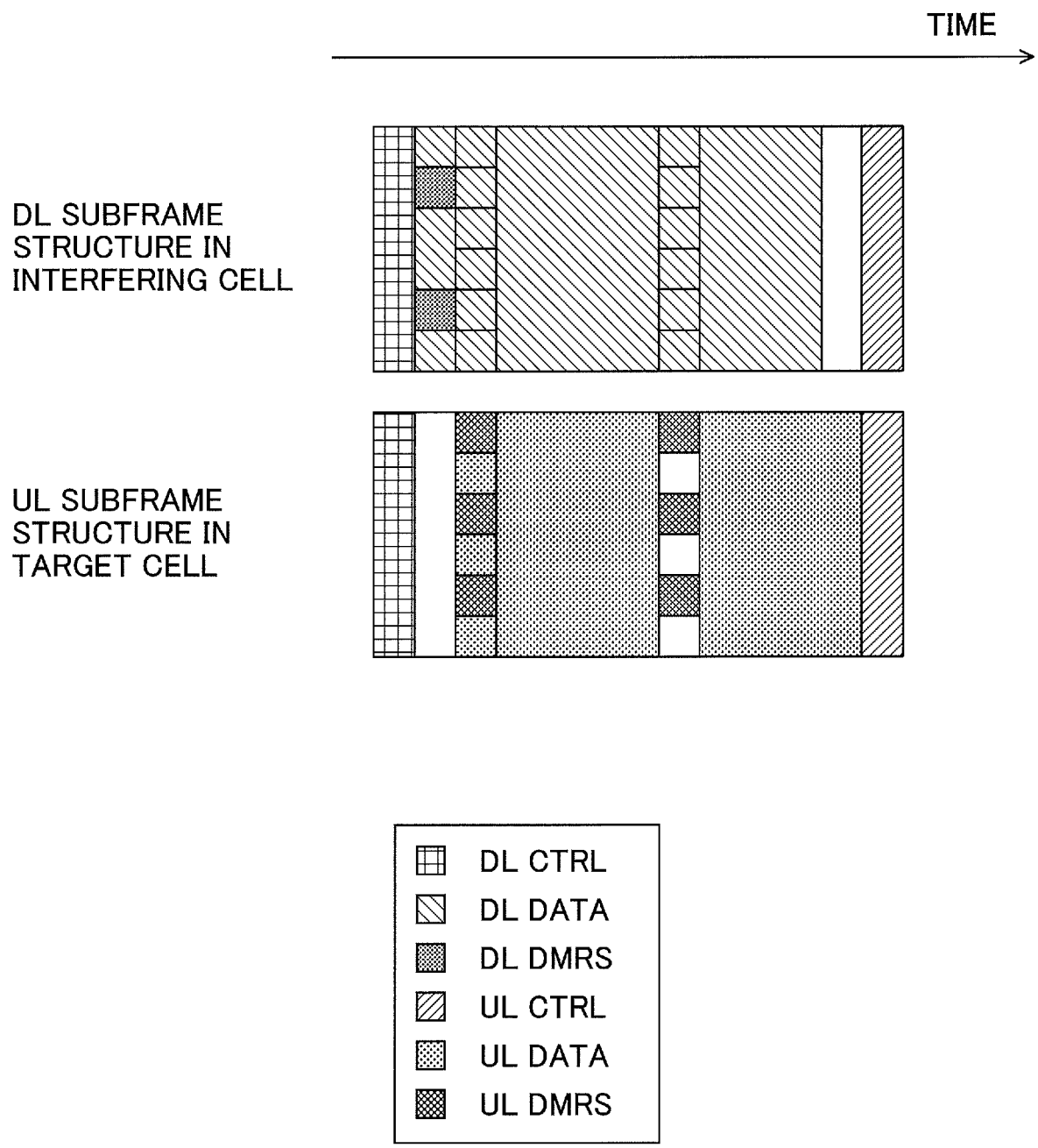
FIG. 14 is a diagram illustrating an arrangement example 3-2 of DMRSs.

FIG. 14 illustrates an arrangement example 3-2 of DMRSs. As illustrated in FIG. 14, UL DMRSs in the target cell are multiplexed into a part of resources corresponding to a symbol at the beginning of a data segment following a guard period in the UL subframe. In the symbol at the beginning of the data segment, resources into which the UL DMRSs are not multiplexed may be used for UL data. In addition, UL DMRSs are also multiplexed into a part of resources corresponding to a symbol at the midpoint of the data segment. While the UL DMRSs are multiplexed into the first of the symbols and into the midpoint of the symbols in FIG. 14, the UL DMRSs may be multiplexed into the first multiple (two or more) symbols and into multiple symbols at the midpoint. In the one or more symbols at the midpoint of the data segment, resources into which the UL DMRSs are not multiplexed are muted. In other words, at the time in which the UL DMRSs are transmitted at the midpoint of the data segment, UL data are not transmitted.

DL DMRSs in the interfering cell are multiplexed into a part of resources corresponding to a symbol at the beginning of a data segment. In the symbol at the beginning of the data segment, resources into which the DL DMRSs are not multiplexed may be used for DL data. In the data segment, resources are not muted and may be used for DL data.

It should be noted that in FIG. 13A, UL DMRSs may be multiplexed into a part of resources corresponding to a symbol at the midpoint of the data segment. When UL DMRSs are arranged in a plurality of resources in the time direction, the tracking error of channel matrix estimation in the time direction can be reduced.

<Interference Rejection Processing 3>

Figure 15:
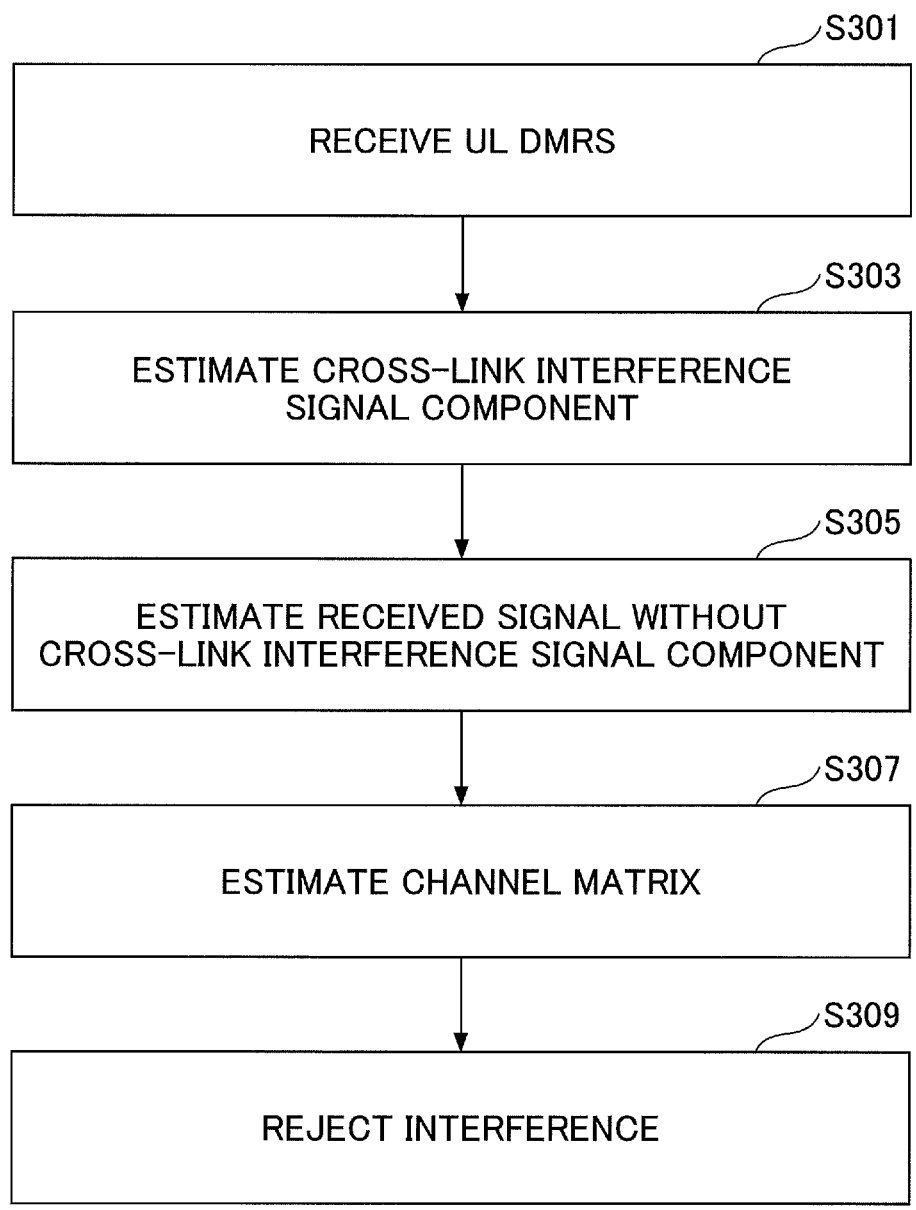
FIG. 15 is a diagram illustrating interference rejection processing 3 in a base station of a target cell.

FIG. 15 illustrates interference rejection processing 3 in a base station of a target cell when the arrangement example 3 is used.

First, the base station receives UL DMRSs (S301). In the arrangement example 3, since DL data are transmitted in a resource in which UL DMRSs are transmitted, the received signals include a cross-link interference signal component. The received signals including the UL DMRSs are expressed in the following equation.

$$y_1(k, l) = \sum_{j=1}^{N_{UE\_UL}} H_j(k, l)s_j(k, l) + \sum_{i=2}^{N_{BS\_DL}} H_i(k, l)d_i(k, l) + n$$

In addition, since resources in the UL subframe are muted, the base station can estimate the cross-link interference signal component of the covariance matrix in the muted resource. The received signals in the muted resource are expressed in the following equation (S303).

$$y_2(k', l') = \sum_{i=2}^{N_{BS\_DL}} H_i(k', l')d_i(k', l') + n$$

By subtracting the received signal in step S303 from the received signal in step S301, the base station determines received signals without the cross-link interference signal component. The received signals without the cross-link interference signal component are expressed in the following equations (S305).

$$y_3(k, l) = \sum_{j=1}^{N_{UE\_UL}} H_j(k, l)s_j(k, l) + \Delta$$

$$\Delta = \sum_{i=1}^{N_{BS\_DL}} H_i(k, l)d_i(k, l) - \sum_{i=2}^{N_{BS\_DL}} H_i(k', l')d_i(k', l')$$

In the equations, when it is assumed that signals in the interfering cell where downlink communication is performed are the same, A is equal to zero ($\Delta=0$) and consequently the received signals without the cross-link interference signal component can be determined. Then, the base station calculates an estimation value $\hat{H}_1(k,l)$ of a channel matrix in the target cell (S307).

The base station rejects interference using the result of step S307 (S309).

<Operations in Base Stations and User Equipment Apparatus>

It is necessary for base stations and a user equipment apparatus to share the arrangement examples 1-3. FIG. 16 illustrates a sequence example in base stations and a user equipment apparatus.

First, a resource arrangement pattern for the UL subframe and a resource arrangement pattern for the DL subframe according to any of the arrangement examples 1-3 (arrangement patterns such as the arrangement examples 1-3) are shared among base stations (S401). The arrangement patterns may be shared via interfaces between the base stations or may be stored in advance in the base stations.

The base station of the target cell generates control information indicating a resource for a UL DMRS and/or a resource to be muted in the UL subframe, and transmits the control information to the user equipment apparatus (S403). The information about the resource for the UL DMRS and the resource to be muted may be provided simultaneously or separately. The provided information may be represented by a bit map indicating resource locations or represented by an index indicating an arrangement pattern (for example, an index indicating any of the arrangement examples 1-3).

The control information may be transmitted via higher layer signaling (for example, RRC signaling) or downlink control information (DCI). While DCI is typically used for allocation of a data channel, the control information indicating the resource for the UL DMRS and/or the resource to be muted may be transmitted via the same DCI for allocation of the data channel or DCI different from the DCI for allocation of the data channel. Alternatively, the control information may be transmitted via both higher layer signaling and DCI. When both higher layer signaling and DCI are used, a plurality of arrangement patterns may be provided via the higher layer signaling and an arrangement pattern to be used in a subframe for UL signal transmission may be provided via the DCI. When carrier aggregation is applied, the control information indicating the resource for the UL DMRS and/or the resource to be muted may be transmitted in a primary component carrier (CC) and the same control information may be transmitted in a secondary CC.

As described above, a resource for a UL DMRS and a resource to be muted are used for interference rejection processing. A subframe portion including a resource to be muted (hereinafter referred to as a "measurement subframe"), which is used to estimate a channel matrix, may be arranged in all resource blocks and all subframes or arranged in part of resource blocks and part of subframes.

Figure 17A:
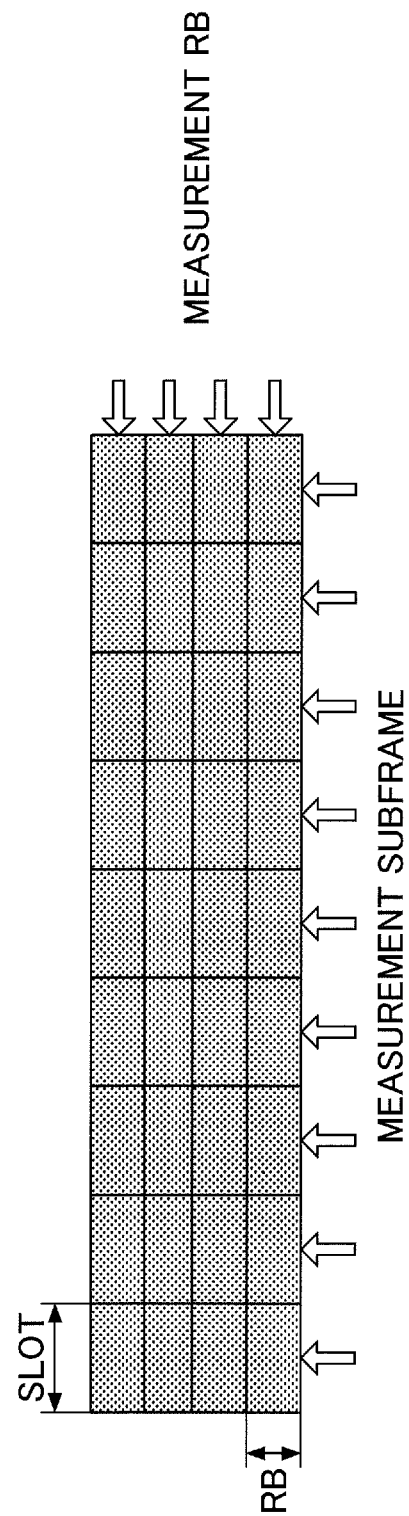
FIG. 17A is a diagram illustrating an arrangement example 1 of measurement subframes.

FIG. 17A illustrates an arrangement example in which a measurement subframe including a resource to be muted is arranged in all resource blocks and all subframes. In other words, in all resource blocks and all subframes, an arrangement pattern such as any of the arrangement examples 1-3 illustrated in FIGS. 6-8, 10-11, and 13-14 is used.

In this case, resource utilization may be decreased because the resource is muted. Thus, the subframe including the resource to be muted may be restricted in the frequency domain and the time domain.

Figure 17B:
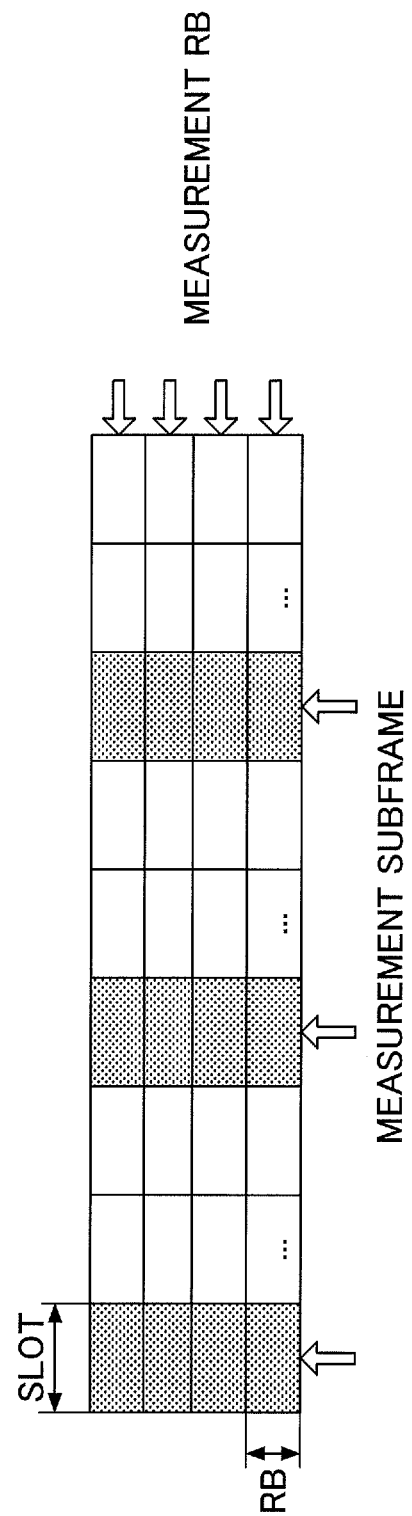
FIG. 17B is a diagram illustrating an arrangement example 2 of measurement subframes.

FIG. 17B illustrates an arrangement example in which a measurement subframe including a resource to be muted is restricted in the time domain. A measurement subframe including a resource to be muted is periodically arranged at intervals of one or more subframes. Although not illustrated in FIG. 17B, the measurement subframe including the resource to be muted may be alternatively restricted in the frequency domain.

Figure 17C:
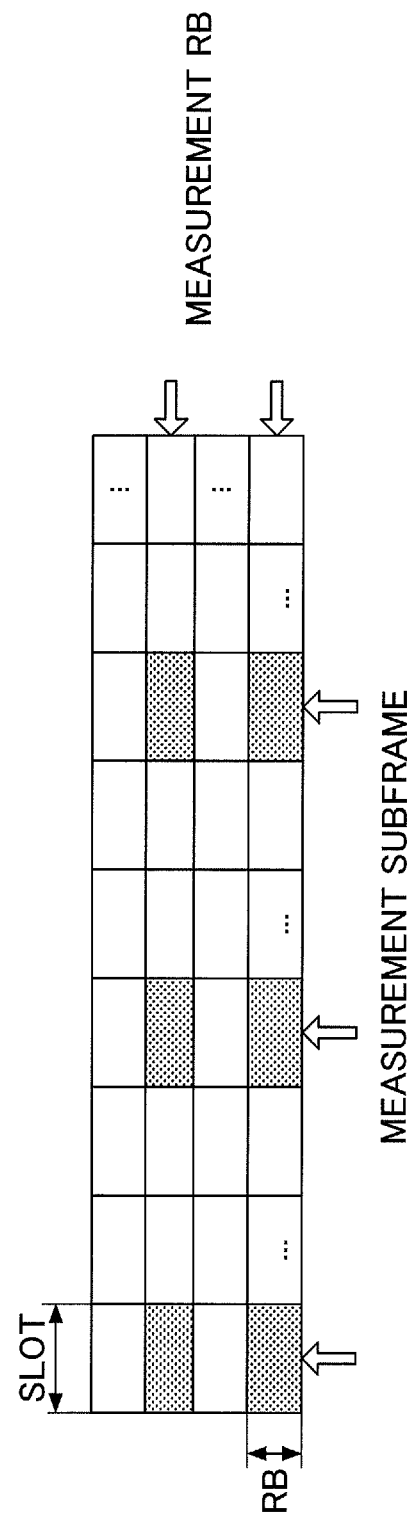
FIG. 17C is a diagram illustrating an arrangement example 3 of measurement subframes.

FIG. 17C illustrates an arrangement example in which a measurement subframe including a resource to be muted is restricted in the frequency domain and the time domain. A measurement subframe including a resource to be muted is periodically arranged at intervals of one or more subframes and at intervals of one or more resource blocks.

The restriction of the measurement subframe may be aperiodically performed. For example, the period may be semi-statically changed using higher layer signaling or the like or may be dynamically changed using DCI or the like.

A base station of an interfering cell transmits a signal using the resource arrangement pattern for the DL subframe (S405). Meanwhile, the user equipment apparatus, having received the control information from the base station, transmits a UL DMRS in a UL subframe according to the control information (S407).

The base station of the target cell receives the UL DMRS from the user equipment apparatus and receives the signal transmitted in a DL subframe from the base station of the interfering cell. The base station of the target cell rejects interference using any of the suppression rejection processing schemes 1-3 according to the arrangement pattern (S409).

While an example with transmission of control information indicating the resources from the base station to the user equipment apparatus is illustrated in FIG. 15, a resource arrangement pattern may be defined in advance by a specification in the radio communication system without transmitting the control information.

<User Equipment Apparatus 100>

Figure 18:
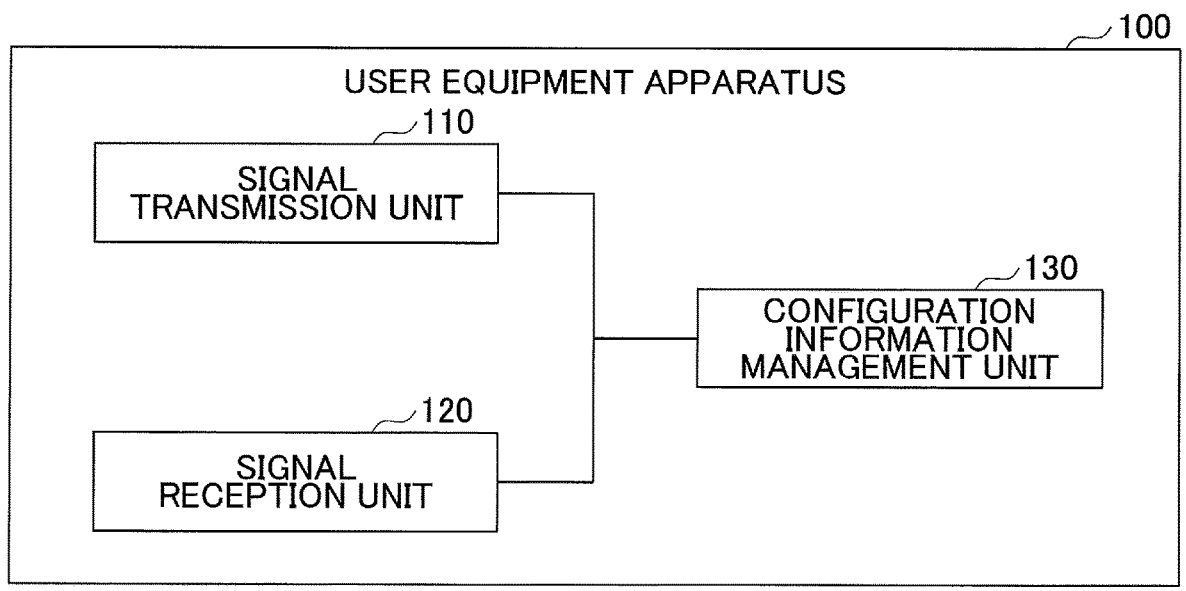
FIG. 18 is a diagram illustrating an example of a functional structure of a user equipment apparatus 100.

FIG. 18 is a diagram illustrating an example of a functional structure of the user equipment apparatus 100. As illustrated in FIG. 18, the user equipment apparatus 100 includes a signal transmission unit 110, a signal reception unit 120, and a configuration information management unit 130. The functional structure illustrated in FIG. 18 is merely an example. The functional units may be classified in any way or may have any names as long as they can perform the operation according to this embodiment.

The signal transmission unit 110 generates a signal in a lower layer from information in a higher layer and wirelessly transmits the signal. The signal reception unit 120 wirelessly receives various signals and acquires information in the higher layer from the received signals.

The configuration information management unit 130 stores configuration information that is configured in advance and configuration information (a resource arrangement pattern for a UL subframe, a resource arrangement pattern for a DL subframe, and/or the like) that is dynamically and/or semi-statically configured by the base station 200 or the like. As described above with reference to FIG. 16, when control information indicating a resource for a UL DMRS and/or a resource to be muted in a UL subframe is transmitted from the base station, the signal reception unit 120 receives the control information and stores it in the configuration information management unit 130. Alternatively, when a resource arrangement pattern is defined in advance by a specification, the resource arrangement pattern is stored in advance in the configuration information management unit 130.

The signal transmission unit 110 generates a UL DMRS according to the resource arrangement pattern stored in the configuration information management unit 130 and transmits the UL DMRS.

<Base Station 200>

Figure 19:
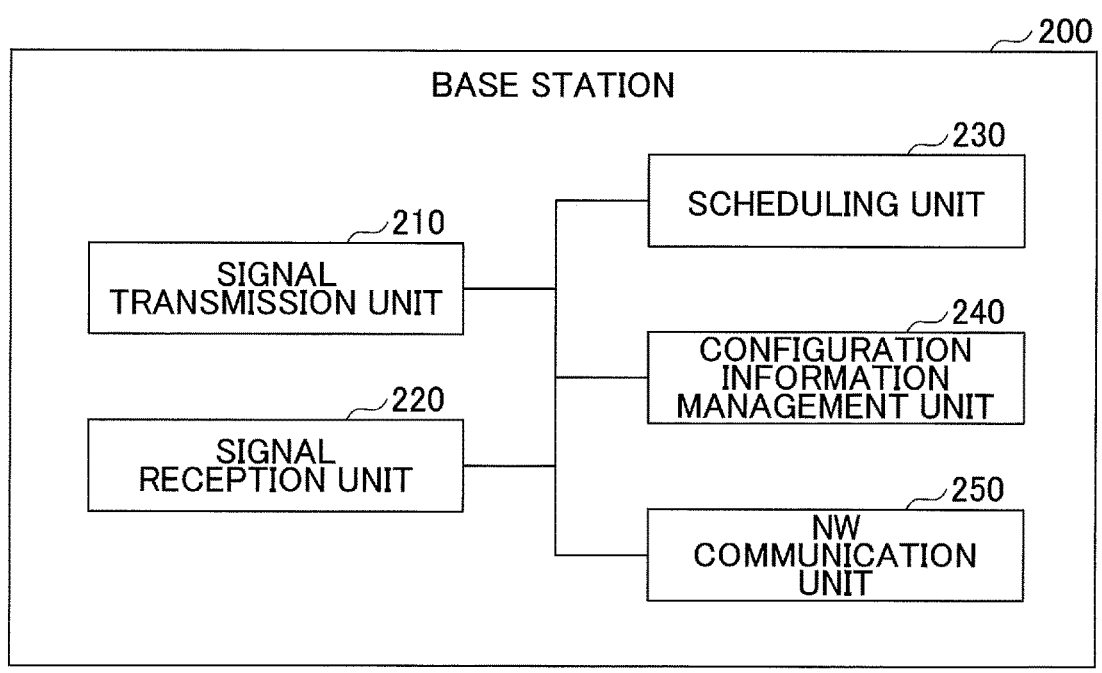
FIG. 19 is a diagram illustrating an example of a functional structure of a base station 200.

FIG. 19 is a diagram illustrating an example of a functional structure of the base station 200. As illustrated in FIG. 19, the base station 200 includes a signal transmission unit 210, a signal reception unit 220, a scheduling unit 230, a configuration information management unit 240, and a NW communication unit 250. The functional structure illustrated in FIG. 19 is merely an example. The functional units may be classified in any way or may have any names as long as they can perform the operation according to this embodiment.

The signal transmission unit 210 generates a signal in a lower layer from information in a higher layer and wirelessly transmits the signal. The signal reception unit 220 wirelessly receives various signals and acquires information in the higher layer from the received signals. In addition, the signal reception unit 220 may have an interference rejection function (for example, an MSE-IRC receiver).

The scheduling unit 230 allocates resources to the user equipment apparatus 100, for example. The configuration information management unit 240 stores configuration information that is configured in advance, determines configuration information (a resource arrangement pattern for a UL subframe, a resource arrangement pattern for a DL subframe, and/or the like) to be dynamically and/or semi-statically configured for the user equipment apparatus 100, and stores the configuration information. In addition, the configuration information management unit 240 stores a resource arrangement pattern or the like to be transmitted to another base station via the NW communication unit 250 and also stores a resource arrangement pattern received from another base station via the NW communication unit 250. The configuration information management unit 240 sends the configuration information to be dynamically and/or semi-statically configured for the user equipment apparatus 100 to the signal transmission unit 210 and directs the signal transmission unit 210 to transmit the configuration information.

The signal transmission unit 210 also generates a DL DMRS according to the configuration information stored in the configuration information management unit 240 and transmits the DL DMRS.

The signal reception unit 220 receives a UL DMRS transmitted from the user equipment apparatus 100 and receives a DL signal transmitted from a base station of an interfering cell. The signal reception unit 220 rejects interference using suppression rejection processing according to the resource arrangement pattern.

<Hardware Configuration>

The block diagrams (FIGS. 18 and 19) used to describe the above-mentioned embodiment illustrate blocks of functional units. The functional blocks (components) are implemented by an arbitrary combination of hardware and/or software. A means for implementing each functional block is not particularly limited. That is, each functional block may be implemented by one apparatus in which a plurality of elements are physically and/or logically coupled or by a plurality of apparatuses that are physically and/or logically separated from each other and are connected directly and/or indirectly (for example, in a wired manner and/or wirelessly).

Figure 20:
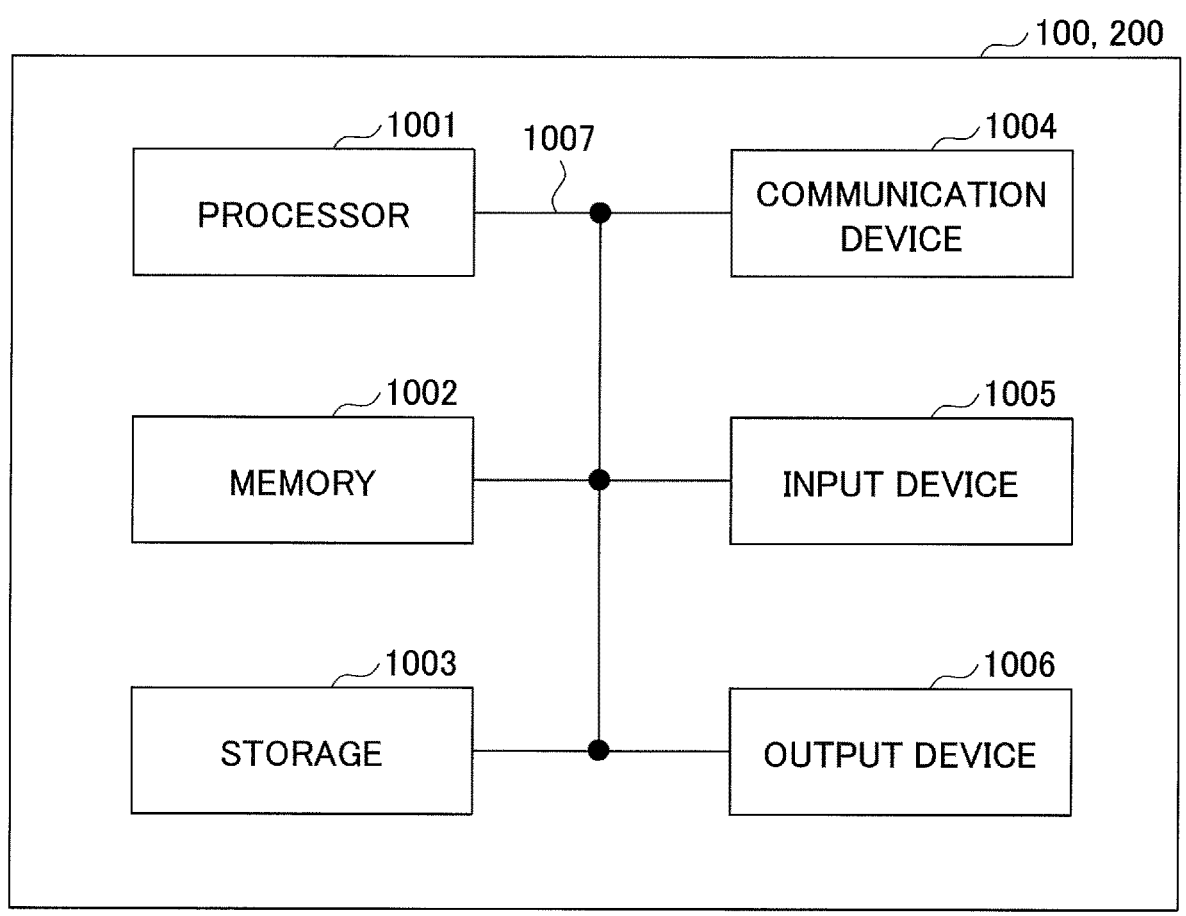
FIG. 20 is a diagram illustrating an example of a hardware configuration of a user equipment apparatus 100 or a base station 200.

For example, each of the user equipment apparatus 100 and the base station 200 according to the embodiment of the invention may function as a computer that performs the processes according to this embodiment. FIG. 20 is a diagram illustrating an example of a hardware configuration of the user equipment apparatus 100 or the base station 200 according to this embodiment. Each of the user equipment apparatus 100 and the base station 200 may be physically configured as a computer device including, for example, a processor 1001, a memory 1002, a storage 1003, a communication device 1004, an input device 1005, an output device 1006, and a bus 1007.

In the following description, the term "device" can be substituted with, for example, a circuit, an apparatus, or a unit. The hardware configuration of the user equipment apparatus or the base station may include one or a plurality of devices represented by reference numerals 1001 to 1006 in FIG. 20 or may not include some of the devices.

Each function of the user equipment apparatus 100 and the base station 200 may be implemented by the following process: predetermined software (program) is read onto hardware such as the processor 1001 or the memory 1002, and the processor 1001 performs an operation to control the communication of the communication device 1004 and the reading and/or writing of data from and/or to the memory 1002 and the storage 1003.

The processor 1001 operates, for example, an operating system to control the overall operation of the computer. The processor 1001 may be a central processing unit (CPU) including, for example, an interface with peripheral devices, a control device, an arithmetic device, and a register.

The processor 1001 reads a program (program code), a software module, or data from the storage 1003 and/or the communication device 1004 to the memory 1002 and performs various types of processes according to the program, the software module, or the data. A program that causes a computer to perform at least some of the operations described in the embodiment may be used. For example, the signal transmission unit 110, the signal reception unit 120, and the configuration information management unit 130 of the user equipment apparatus 100 illustrated in FIG. 18 may be implemented by a control program that is stored in the memory 1002 and is executed by the processor 1001. For example, the signal transmission unit 210, the signal reception unit 220, the scheduling unit 230, the configuration information management unit 240, and the NW communication unit 250 of the base station 200 illustrated in FIG. 19 may be implemented by a control program that is stored in the memory 1002 and is executed by the processor 1001. In the embodiment, the above-mentioned various processes are performed by one processor 1001. However, the processes may be simultaneously or sequentially performed by two or more processors 1001. The processor 1001 may be mounted on one or more chips. The program may be transmitted over the network through a telecommunication line.

The memory 1002 is a computer-readable recording medium and may include, for example, at least one of a read only memory (ROM), an erasable programmable ROM (EPROM), an electrically erasable programmable ROM (EEPROM), and a random access memory (RAM). The memory 1002 may be also referred to as, for example, a register, a cache, or a main memory (main storage device). The memory 1002 can store, for example, an executable program (program code) and a software module that can perform the processes according to the embodiment of the invention.

The storage 1003 is a computer-readable recording medium and may include, for example, at least one of an optical disk such as a compact disc ROM (CD-ROM), a hard disk drive, a flexible disk, a magneto-optical disk (for example, a compact disc, a digital versatile disc, or a Blu-ray (registered trademark) disc), a smart card, a flash memory (for example, a card, a stick, or a key drive), a floppy (registered trademark) disk, and a magnetic strip. The storage 1003 may be also referred to as an auxiliary storage device. The above-mentioned storage medium may be, for example, a database, a server, and other suitable media including the memory 1002 and/or the storage 1003.

The communication device 1004 is hardware (a transmission and reception device) for communicating with a computer through a wired and/or wireless network and is also referred to as, for example, a network device, a network controller, a network card, or a communication module. For example, the signal transmission unit 110 and the signal reception unit 120 of the user equipment apparatus 100 may be implemented by the communication device 1004. The signal transmission unit 210 and the signal reception unit 220 of the base station 200 may be implemented by the communication device 1004.

The input device 1005 is an input unit (for example, a keyboard, a mouse, a microphone, a switch, a button, or a sensor) that receives an input from the outside. The output device 1006 is an output unit (for example, a display, a speaker, or an LED lamp) that performs an output process to the outside. The input device 1005 and the output device 1006 may be integrated into a single device (for example, a touch panel).

Devices such as the processor 1001 and the memory 1002 are connected to each other via the bus 1007 for information communication. The bus 1007 may be a single bus or the devices may be connected to each other by different buses.

Each of the user equipment apparatus 100 and the base station 200 may include hardware such as a microprocessor, a digital signal processor (DSP), an application specific integrated circuit (ASIC), a programmable logic device (PLD), and a field programmable gate array (FPGA). Some or all of the functional blocks may be implemented by the hardware. For example, the processor 1001 may be implemented by at least one of these hardware components.

<Effects of Embodiment>

According to an embodiment of the present invention, in a radio communication system in which uplink communication and downlink communication are dynamically changed, a communication apparatus in a target cell can receive a demodulation reference signal in the target cell and reject interference including a cross-link interference signal component.

For example, by using the arrangement example 1, the cross-link interference signal component can be accurately estimated and the accuracy of estimating interference can be improved.

Compared to the arrangement example 1, the accuracy of estimating interference is low according to the arrangement example 2 or 3. However, by using the arrangement example 2 or 3, the number of resources to be muted can be reduced and thus resource utilization can be improved.

In addition, by restricting a subframe including a resource to be muted in the frequency domain and/or the time domain, resource utilization can be further improved.

<Supplementary Explanation>

The embodiment of the invention has been described above. However, the disclosed invention is not limited to the embodiment and it will be understood by those skilled in the art that various variations, modifications, alterations, and substitutions can be made. Specific numerical examples are used to facilitate the understanding of the invention. However, the numerical values are merely examples and any appropriate values may be used, unless otherwise stated. The classification of the sections in the above-mentioned description is not essential in the invention and matters described in two or more sections may be combined and used, if necessary. Matters described in one section may be applied to matters described in another section (unless a contradiction arises). The boundaries between the functional units or the processing units in the functional block diagram do not necessarily correspond to the boundaries between physical components. The operation of a plurality of functional units may be physically performed by one component. Alternatively, the operation of one functional unit may be physically performed by a plurality of components. In the procedures described in the embodiment, the order of the processes may be changed unless a contradiction arises. For convenience of explanation of the processes, the user equipment apparatus 100 and the base station 200 have been described with reference to the functional block diagrams. However, the apparatuses may be implemented by hardware, software, or a combination thereof. The software that is operated by the processor included in the user equipment apparatus 100 according to the embodiment of the invention and the software that is operated by the processor included in the base station 200 according to the embodiment of the invention may be stored in a random access memory (RAM), a flash memory, a read only memory (ROM), an EPROM, an EEPROM, a register, a hard disk (HDD), a removable disk, a CD-ROM, a database, a server, and other suitable storage media.

Regardless of the fact that software is referred to as software, firmware, middleware, a microcode, a hardware description language, or another name, the software is broadly interpreted to include an instruction, an instruction set, a code, a code segment, a program code, a program, a sub-program, a software module, an application, a software application, a software package, a routine, a subroutine, an object, an executable file, an execution thread, a procedure, a function, or the like.

Software, an instruction, or the like may be transmitted or received via a transmission medium. For example, when software is transmitted from a website, a server, or another remote source using a wired technology such as a coaxial cable, an optical cable, a twisted pair, and a digital subscriber line (DSL) and/or a wireless technology such as an infrared ray, radio, and microwaves, the wired technology and/or the wireless technology is included in the definition of a transmission medium.

The transmission of information is not limited to the aspects/embodiments described in the specification and may be performed by other means. For example, the transmission of information may be performed by physical layer signaling (for example, downlink control information (DCI) or uplink control information (UCI)), higher layer signaling (for example, radio resource control (RRC) signaling, medium access control (MAC) signaling, or broadcast information (a master information block (MIB) and a system information block (SIB))), another signal, or a combination thereof. The RRC signaling may be also referred to as an RRC message and may be, for example, an RRC connection setup message or an RRC connection reconfiguration message.

Information or the like can be output from a higher layer (or a lower layer) to a lower layer (or a higher layer). Information or the like may be input or output via a plurality of network nodes.

The input or output information or the like may be stored in a specific location (for example, a memory) or may be managed in a management table. The input or output information or the like may be overwritten, updated, or edited. The output information or the like may be deleted. The input information or the like may be transmitted to another apparatus.

Determination may be made based on a value (0 or 1) represented by 1 bit, may be made based on a true or false value (boolean: true or false), or may be made based on comparison with a numerical value (for example, comparison with a predetermined value).

The information, the signal, and the like described in the specification may be represented using any of various technologies. For example, the data, the instruction, the command, the information, the signal, the bit, the symbol, the chip, and the like mentioned throughout the description may be represented by a voltage, a current, an electromagnetic wave, a magnetic field, or a magnetic particle, an optical field or a photon, or any combination thereof.

The terms described in the specification and/or terms necessary to understand the specification may be replaced with terms that have same or similar meanings. For example, a channel and/or a symbol may be a signal. A signal may be a message. A component carrier (CC) may be referred to as a carrier frequency, a cell, or the like.

Each aspect/embodiment described in the specification may be applied to systems using Long Term Evolution (LTE), LTE-Advanced (LTE-A), SUPER 3G, IMT-Advanced, 4G, 5G, Future Radio Access (FRA), W-CDMA (registered trademark), GSM (registered trademark), CDMA2000, Ultra Mobile Broadband (UMB), IEEE 802.11 (Wi-Fi), IEEE 802.16 (WiMAX), IEEE 802.20, Ultra-WideBand (UWB), Bluetooth (registered trademark), and other suitable systems and/or next-generation systems that have functionality enhanced based on these systems.

The terms "system" and "network" used in the specification are interchangeably used.

In each aspect/embodiment described in the specification, for example, the order of the processes in the procedure, the sequence, and the flowchart may be changed unless a contradiction arises. For example, for the method described in the specification, elements of various steps are presented in the exemplified order. However, the invention is not limited to the presented specific order.

In the specification, a specific operation performed by the base station 200 may be performed by an upper node of the base station. In a network having one or a plurality of network nodes including the base station 200, it is clearly understood that various operations performed for communication with the user equipment apparatus 100 can be performed by the base station 200 and/or a network node (for example, including an MME or an S-GW without limitation) other than the base station 200. The number of network nodes other than the base station 200 is not limited to one, and a plurality of other network nodes (for example, an MME and an S-GW) may be combined with each other.

The aspects/embodiments described in the specification may be individually used, may be combined, or may be switched during execution. In addition, transmission of predetermined information (for example, transmission of "being X") is not limited to being performed explicitly, but may be performed implicitly (for example, the transmission of the predetermined information is not performed).

The information, the parameter, or the like described in the specification may be represented by an absolute value, may be represented by a relative value from a predetermined value, or may be represented by another piece of corresponding information. For example, a radio resource may be indicated using an index.

The names used for the above-described parameters are not limited in any respect. Further, a numerical expression or the like in which the parameters are used can be different from the numerical expression disclosed explicitly in the specification. Since various channels (for example, a PUCCH and a PDCCH) and information elements (for example, TPC) can be identified with any suitable names, various names allocated to the various channels and the information elements are not limited in any respect.

The terms "determining" and "deciding" used in the specification include various operations. The terms "determining" and "deciding" can include, for example, "determination" and "decision" for judging, calculating, computing, processing, deriving, investigating, looking-up (for example, looking-up in a table, a database, or another data structure), and ascertaining operations. In addition, the terms "determining" and "deciding" can include "determination" and "decision" for receiving (for example, information reception), transmitting (for example, information transmission), input, output, and accessing (for example, accessing data in a memory) operations. The terms "determining" and "deciding" can include "determination" and "decision" for resolving, selecting, choosing, establishing, and comparing operations. That is, the terms "determining" and "deciding" can include "determination" and "decision" for any operation.

The term "based on" used in the specification does not mean "only based on" unless otherwise stated. In other words, the term "based on" means both "only based on" and "at least based on".

The terms "include" and "including" and the modifications thereof are intended to be inclusive, similarly to the term "comprising", as long as they are used in the specification or the claims. In addition, the term "or" used in the specification or the claims does not mean exclusive OR.

In the entire disclosure, for example, when an article, such as "a", "an", or "the", in English is added by translation, the article can include the meaning of the plural unless explicitly specified otherwise in the context.

The invention has been described in detail above. It will be apparent to those skilled in the art that the invention is not limited to the embodiments described in the specification. Various modifications and changes can be made, without departing from the scope and spirit of the invention described in the claims. Therefore, the embodiments described in the specification are illustrative and do not limit the invention.

The present international application is based on and claims the benefit of priority of Japanese Patent Application No. 2017-001453 filed on Jan. 6, 2017, the entire contents of which are hereby incorporated by reference.

DESCRIPTION OF NOTATIONS 100 user equipment apparatus
110 signal transmission unit
120 signal reception unit
130 configuration information management unit
200 base station
210 signal transmission unit
220 signal reception unit
230 scheduling unit
240 configuration information management unit
250 nw communication unit
1001 processor
1002 memory
1003 storage
1004 communication device
1005 input device
1006 output device

The invention claimed is:

1. A terminal, comprising:
a receiver configured to receive, from a first base station using a communication scheme in which uplink communication and downlink communication can be changed, control information indicating a resource for an uplink demodulation reference signal arranged in a plurality of symbols at a beginning of a subframe used for transmitting uplink data; and
wherein a resource for a downlink demodulation reference signal transmitted from a second base station that interferes with the first base station and that uses a communication scheme in which uplink communication and downlink communication can be changed is arranged in a single symbol at a beginning of a subframe used for transmitting downlink data, a time position of the subframe used for transmitting downlink data is the same as a time position of the subframe used for transmitting uplink data, and
a transmitter configured to transmit, to the first base station, the uplink demodulation reference signal according to the control information,
wherein the control information, indicating the resource for the uplink demodulation reference signal arranged in the plurality of the symbols at the beginning of the subframe, is transmitted through radio resource control (RRC) signaling.

2. The terminal as claimed in claim 1,
wherein in the subframe used for transmitting the downlink data, a resource corresponding to the resource for the uplink demodulation reference signal is muted.

3. The terminal as claimed in claim 2,
wherein in the plurality of symbols at the beginning of the subframe used for transmitting the uplink data, a resource into which the uplink demodulation reference signal is not multiplexed is muted.

4. The terminal as claimed in claim 1,
wherein in the plurality of symbols at the beginning of the subframe used for transmitting the uplink data, a resource into which the uplink demodulation reference signal is not multiplexed is muted.

5. A demodulation reference signal transmission method, comprising:

receiving, from a first base station using a communication scheme in which uplink communication and downlink communication can be changed, control information indicating a resource for an uplink demodulation reference signal arranged in a plurality of symbols at a beginning of a subframe used for transmitting uplink data; and transmitting, to the first base station, the uplink demodulation reference signal according to the control information, wherein a resource for a downlink demodulation reference signal transmitted from a second base station that interferes with the first base station and that uses a communication scheme in which uplink communication and downlink communication can be changed is arranged in a single symbol at a beginning of a subframe used for transmitting downlink data, a time position of the subframe used for transmitting downlink data is the same as a time position of the subframe used for transmitting uplink data, and wherein the control information, indicating the resource for the uplink demodulation reference signal arranged in the plurality of symbols at the beginning of the subframe, is transmitted through radio resource control (RRC) signaling.

6. A network node using a communication scheme in which uplink communication and downlink communication can be changed, comprising:

a transmitter configured to transmit control information indicating a resource for an uplink demodulation reference signal arranged in a plurality of symbols at a beginning of a subframe used for transmitting uplink data; and a receiver configured to receive the uplink demodulation reference signal transmitted by a terminal according to the control information;

wherein a resource for a downlink demodulation reference signal transmitted from another network node that interferes with the network node and that uses a communication scheme in which uplink communication and downlink communication can be changed is arranged in a single symbol at a beginning of a subframe used for transmitting downlink data, a time position of the subframe used for transmitting downlink data is the same as a time position of the subframe used for transmitting uplink data, and wherein the control information, indicating the resource for the uplink demodulation reference signal arranged in the plurality of symbols at the beginning of the subframe, is transmitted through radio resource control (RRC) signaling.

7. A communication system comprising a first base station using a communication scheme in which uplink communication and downlink communication can be changed, a second base station using a communication scheme in which uplink communication and downlink communication can be changed, and a terminal:

the first base station comprising:
a transmitter configured to transmit control information indicating a resource for an uplink demodulation reference signal arranged in a plurality of symbols at a beginning of a subframe used for transmitting uplink data; and
a receiver configured to receive the uplink demodulation reference signal transmitted by the terminal according to the control information;

the terminal comprising:
a receiver configured to receive, from the first base station, the control information indicating the resource for the uplink demodulation reference signal arranged in the plurality of symbols at the beginning of the subframe used for transmitting uplink data; and
a transmitter configured to transmit, to the first base station, the uplink demodulation reference signal according to the control information, wherein a resource for a downlink demodulation reference signal transmitted from the second base station that interferes with the first base station is arranged in a single symbol at a beginning of a subframe used for transmitting downlink data, a time position of the subframe used for transmitting downlink data is the same as a time position of the subframe used for transmitting uplink data, and wherein the control information, indicating the resource for the uplink demodulation reference signal arranged in the plurality of symbols at the beginning of the subframe, is transmitted through radio resource control (RRC) signaling.

* * * * *